United States Patent [19]

Olson et al.

[11] Patent Number: 4,679,189

[45] Date of Patent: Jul. 7, 1987

[54] ALTERNATE ROUTING ARRANGEMENT

[75] Inventors: Jeffrey J. Olson; Stephen R. Peck; David P. Seaton, all of Boulder, Colo.

[73] Assignees: American Telephone and Telegraph Company; AT&T Information Systems, Inc., both of Holmdel, N.J.

[21] Appl. No.: 802,573

[22] Filed: Nov. 27, 1985

[51] Int. Cl.$^4$ .......................... H04Q 11/04; H04J 3/24
[52] U.S. Cl. ........................................... 370/60; 370/94
[58] Field of Search .............................. 370/60, 64, 16

[56] References Cited

U.S. PATENT DOCUMENTS

| | | | |
|---|---|---|---|
| 4,287,592 | 9/1981 | Paulish et al. | 370/94 |
| 4,308,613 | 12/1981 | Chasek | 370/16 |
| 4,506,358 | 3/1985 | Montgomery | 370/60 |
| 4,512,011 | 4/1985 | Turner | 370/60 |
| 4,532,625 | 7/1985 | Storer | 370/60 |
| 4,550,397 | 10/1985 | Turner et al. | 370/94 |
| 4,551,833 | 11/1985 | Turner | 370/60 |

OTHER PUBLICATIONS

"Mechanisms that Enforce Bounds on Packet Lifetimes", ACM Transactions on Computer Systems, vol. 1, No. 4, Nov. 1983, pp. 311-330.
"Routing and Flow Control in Systems Network Architecture", IBM Syst J, vol. 18, No. 2, 1979, pp. 298-314.
"Communications Architectures & Protocols", Computer Communication Review", vol. 13, No. 2, Mar. 1983, pp. 162-169.

Primary Examiner—Douglas W. Olms
Assistant Examiner—Frank M. Scutch, III
Attorney, Agent, or Firm—Donald M. Duft

[57] ABSTRACT

Improved alternate routing in a packet switching system is provided by inserting alternate routing control information into each packet and by storing alternate routing information at each network node. The stored information at each node includes a list of the available paths extending from the node towards all other nodes together with a list of available algorithms that can be used to select one of the available routes. The alternate routing control information in each packet contains postage information specifying the maximum number of nodes through which the packet is to travel. The alternate routing control information also includes a destination node index code identifying the destination node. The destination node index is used as address information by each node receiving a packet to read out the stored information at the node identifying the available paths and the algorithm to be used in selecting one of these paths for use in transmitting the packet towards the destination node. The identified algorithm is then executed to select the path to be used.

29 Claims, 32 Drawing Figures

PACKET SWITCH

FIG. 4
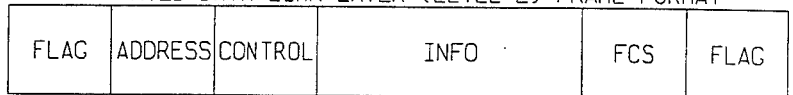
FIG. 5
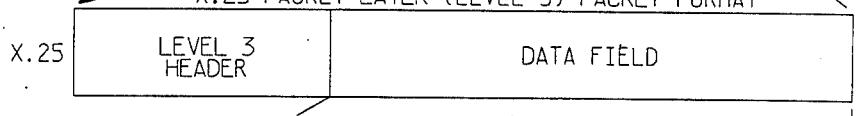
FIG. 6
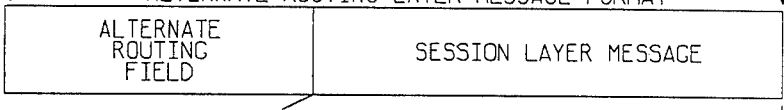
FIG. 7
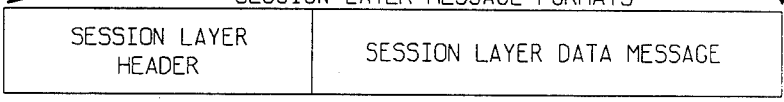
FIG. 8
| SESSION LAYER HEADER | SESSION LAYER CONTROL MESSAGE |

FIG. 9

LEVEL 3 HEADER

| GENERAL FORMAT IDENTIFIER | LOGICAL CHANNEL IDENTIFIER | PACKET SEND SEQUENCE NUMBER | PACKET RECEIVE SEQUENCE NUMBER |
|---|---|---|---|

FIG. 10

LEVEL 2 FRAME

| L2 HEADER | L3 HEADER | ARF | SLDH (SESSION LAYER DATA HEADER) | APPLICATION MESSAGE | L2 FCS |
|---|---|---|---|---|---|

FIG. 11

ALTERNATE ROUTING FIELD

| ARFH HEXIDECIMAL 40 | POSTAGE | DESTINATION MAP INDEX | DESTINATION LOGIC CHANNEL INDEX |
|---|---|---|---|

FIG. 12

RELATION OF ALTERNATIVE ROUTING LAYER TO ISO MODEL AND EXISTING X.25 LAYER

| APPLICATION LAYER |
|---|
| SESSION LAYER |
| (NEW) ALTERNATE ROUTING LAYER |
| X.25 PACKET LAYER (LEVEL 3) |
| X.25 DATA LINK LAYER (LEVEL 2) |
| X.24 PHYSICAL LAYER (LEVEL 1) |

FIG. 15  A FIXED NETWORK CHANNEL

| AR BIT: | LINK: | LOGICAL CHANNEL: |
|---|---|---|
| 0 | X | Y |
| | X' | Y' |

FIG. 16  AN ALTERNATE ROUTING NETWORK CHANNEL

| AR BIT: | LINK: | LOGICAL CHANNEL: |
|---|---|---|
| 0 | X | Y |
| | 0 | 0 |

FIG. 17

DESTINATION MAP INDEX

ROUTE-1 (PRIMARY) | ROUTE-2 (SECONDARY) | ... | ROUTE-N (LAST)

NRTS | ALG | $X'_1$ | $Y'_1$     $X'_2$ | $Y'_2$    ...    $X'_n$ | $Y'_n$

NTRS = NUMBER OF ROUTES DEFINED (1 < NTRS < n)
ALG = ALGORITHM TO BE USED (0, 1, 2, OR 3)

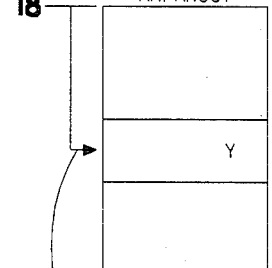

FIG. 18 — ARFANOUT

Y

DESTINATION LOGICAL CHANNEL INDEX

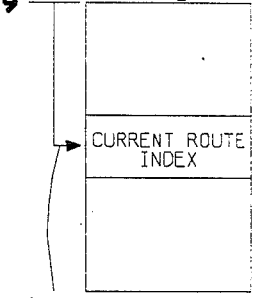

FIG. 19 — CURRENT_ROUTE

CURRENT ROUTE INDEX

DESTINATION MAP INDEX

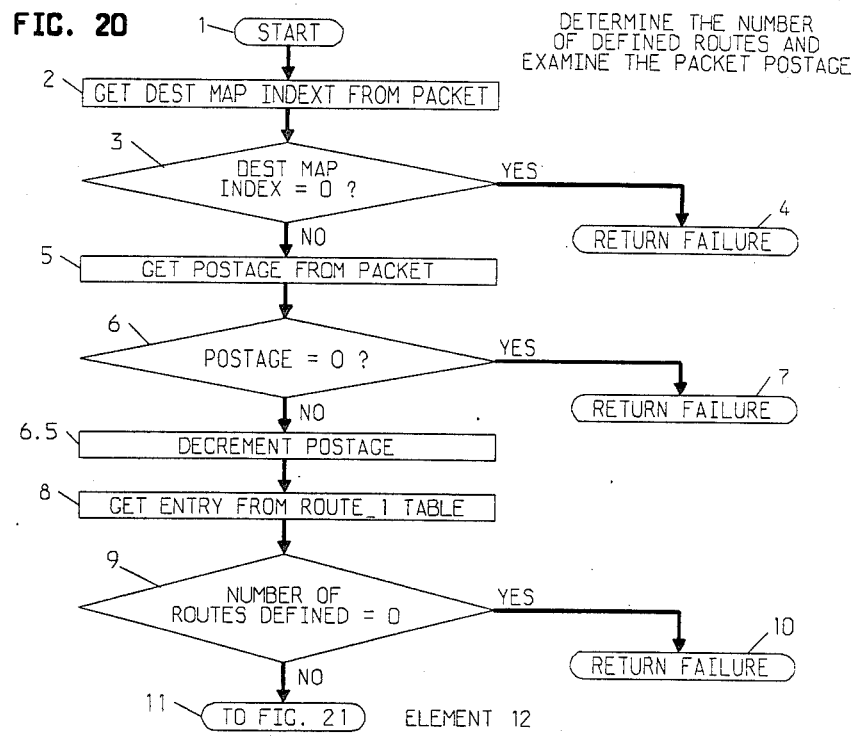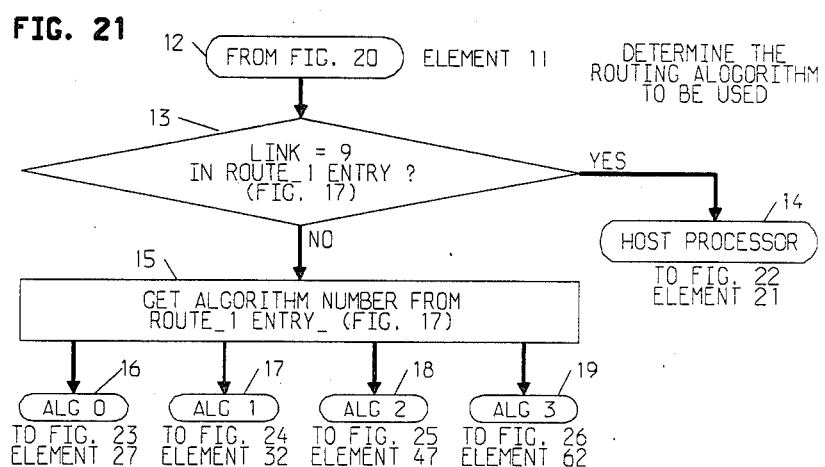

FIXED ROUTING

DESTINATION MAP FOR DESTINATION = NODE A

DESTINATION MAP FOR DESTINATION = NODE B

DESTINATION MAP FOR DESTINATION = NODE C

FIG. 30 ROUTING TABLES

AT NODE A

| | ROUTE-1 | ROUTE-2 | ROUTE-3 |
|---|---|---|---|
| MAP A | 9 | 0 | 0 |
| MAP B | 3 | 7 | 0 |
| MAP C | 7 | 3 | 0 |

AT NODE B

| ROUTE-1 | ROUTE-2 | ROUTE-3 |
|---|---|---|
| 4 | 6 | 0 |
| 9 | 0 | 0 |
| 6 | 4 | 0 |

AT NODE C

| ROUTE-1 | ROUTE-2 | ROUTE-3 |
|---|---|---|
| 7 | 5 | 0 |
| 5 | 7 | 0 |
| 9 | 0 | 0 |

FIG. 31
MULTIPLE DESTINATION MAPS WITH DIFFERENT ALGORITHMS

AT NODE A

| | | ROUTE-1 | ROUTE-2 | ROUTE-3 |
|---|---|---|---|---|
| MAP B1 | 1 | 3 | 7 | 0 |

↑—ALG.

| | | ROUTE-1 | ROUTE-2 | ROUTE-3 |
|---|---|---|---|---|
| MAP B2 | 2 | 3 | 7 | 0 |

AT NODE B

| | ROUTE-1 | ROUTE-2 | ROUTE-3 |
|---|---|---|---|
| 1 | 9 | 0 | 0 |
| 2 | 9 | 0 | 0 |

AT NODE C

| | ROUTE-1 | ROUTE-2 | ROUTE-3 |
|---|---|---|---|
| 1 | 5 | 7 | 0 |
| 2 | 5 | 7 | 0 |

FIG. 32
ADDITIONAL DESTINATION MAPS WITH DIFFERENT PATHS

AT NODE A

| | ROUTE-1 | ROUTE-2 | ROUTE-3 |
|---|---|---|---|
| MAP B3 | 7 | 3 | 0 |

AT NODE B

| ROUTE-1 | ROUTE-2 | ROUTE-3 |
|---|---|---|
| 9 | 0 | 0 |

AT NODE C

| ROUTE-1 | ROUTE-2 | ROUTE-3 |
|---|---|---|
| 7 | 5 | 0 |

ALTERNATE ROUTING ARRANGEMENT

FIELD OF THE INVENTION

This invention relates to a packet switched network having improved alternate routing facilities.

BACKGROUND OF THE INVENTION

Complex packet switching networks are known in which there is more than one available path between any given pair of nodes. It is also known to provide session based communication between one of a plurality of applications at a first node and one of a plurality of applications at a second node. It is a problem in session based networks of this type that the failure of a node or a link comprising a portion of the path utilized by a session will terminate the communication. This is a problem of the packet switch network shown in U.S. Pat. No. 4,488,004 to Bogart et al of Dec. 11, 1984. With alternate routing facilities, communication can be reestablished with minimal disruption using other paths, links and nodes. While the currently available alternate routing network facilities are operable to perform their intended function, their performance is less than optimal because they are complex, costly, and may cause temporary service disruptions. They are also often incompatible with popular protocol standards such as, for example, X.25.

One such currently available alternate routing arrangement, typified by SNA Multiple routing, may be termed "Static Decision Making by the Session Originator". This arrangement allows a path failure to disrupt the current session, but it provides a means for the session originating process to specify a new path on which a new session may be established. The procedures used to specify the new path require detailed global knowledge of the network by the session originating process and a complicated protocol for communicating the newly specified path information to the lower layer packet switches responsible for implementing the changes required to establish the new path. In short, this prior art arrangement introduces considerable complexity, it is incompatible with X.25, and it still does not attempt to prevent session disruption and lost messages.

A second alternate routing arrangement in the prior art may be termed "Dynamic Decision Making by a Centralized Controller". This arrangement is termed dynamic since it detects transmission failures at the packet layer and attempts to reroute the affected packets without disturbing the session between the client applications. This method employs a centralized controller which must have updated knowledge regarding the current health of all links and nodes in the network. This, in turn, entails certain cost and complexity within the controller so that it has this knowledge. Furthermore, the phenomenon of looping is possible in this arrangement due to the dynamic changing of paths.

A third alternate routing arrangement in the prior art may be termed the "Dynamic Decision by a Distributed Controller". This arrangement requires that information specifying link status and health of all nodes of the network be transmitted to controllers at all nodes of the network. This arrangement suffers from the problems inherent to synchronized distributed data bases. If this is not done to perfection, looping and other such undesirable events may occur. In addition, the communication involved in this synchronization involves overhead communication on the network itself, above and beyond the normal traffic the network is designed to carry.

A general problem associated with dynamic alternate routing arrangements in the prior art is the difficulty of constraining paths for security reasons so that messages requiring a high level of security will not be transmitted over facilities that do not provide the required security level. Static routing arrangements allow such constraints to be applied when the system administrator or network engineer configures the network.

Thus, in summary of session based packet switch communication, alternate routing facilities are currently available to pick a new path in the event a first selected path fails. However, they all suffer from one or more of the following deficiencies: (1) session disruption, (2) network overhead, (3) expensive hardware, software and additional components, (4) difficulty of constraints for security reasons, (5) possibility of looping and (6) incompatibility with the X.25 protocol.

SUMMARY OF THE INVENTION

We provide an alternate routing arrangement for a packet switched network that encompasses the advantages of both static and dynamic routing while involving the disadvantages of neither.

Unlike the prior art methods, all of which may be termed "deterministic" in that they involve the specification of completely defined alternate paths, the present invention is best described as "probabilistic". It is based on the following premise: of the many distinct physical paths exiting any given node in a topologically redundant network, a few of these paths are clearly preferable on the basis of topology alone given knowledge of the ultimate destination. Thus it is not necessary to determine an alternate path completely through the network in order to circumvent a localized failure. Rather it is sufficient merely to choose a different exit path from among the few that are more likely to lead closer to the desired destination. This decision making process is easy to implement on a dynamic basis in the lower layers of the protocol so that session layer disruption is avoided. Moreover, the identification and selection of the preferred exit paths at each node of the network can be done statically by the network designer or system administrator in such a way that security constraints are easily accommodated.

The present invention is summarized as follows. Consider a network of packet switches having one packet switch at each node. Let the interconnecting links between nodes be redundant in the sense that between any given pair of nodes there are multiple physical paths each consisting of one or more links. The invention consists of (1) static information stored at each packet switch in the network, (2) additional information carried in all packets traversing the network, and (3) new procedures implemented by each packet switch in the network. No additional equipments are required and no changes to session layer protocol are required.

In order to proceed further with the description of the invention, it is necessary to introduce the term "destination map". This term refers to the collection of information which defines, at all nodes of the network, the allowed exit paths from these nodes for a packet bound for a specified destination node within the network. The term "component" refers to the subset of this collection of information residing at a particular node of the network. An exit path comprises sufficient routing information to uniquely define one of the possible paths that can be used to exit that node. The destination map component also includes the criterion to be used by each node in selecting from among the allowed exit paths at that node.

Since any node of the network may be a destination for incoming packets, in general there is at least one destination map defined for every node in the network. Additional benefits of the invention arise from allowing multiple destination maps to be defined for a single physical destination node. It is important to note that each destination map defined on the network has a distinct component at every node of the network. Thus in a network of N nodes there will be at least N destination maps each consisting of N components.

The static information stored at an individual node of the network in accordance with our invention consists principally of that node's components of all the destination maps defined on the network. In addition, there is a directory defining the location within this node of all sessions active at this node. Note that the static information at each node contains only information which is local to that node.

The additional information contained in each packet in accordance with our invention comprises a new protocol layer, referred to as the "Alternate Routing Layer". This new layer is located between the existing session layer protocol header and the packet layer protocol header. The information in this alternate routing layer consists of four components which are referred to as (1) the "Alternate Routing Field Header", (2) the "Postage", (3) the "Destination Map Index", and (4) the "Destination Logical Channel Index". The alternate routing field header allows packets containing an alternate routing field to be distinguished from packets which do not contain an alternate routing field. The postage component is decremented and tested by each packet switch through which the packet passes in order to prevent ad infinitum looping of packets in the network. The destination map index is used by intermediate nodes to specify the route or routes the packet can take in traveling from that intermediate node to subsequent nodes. The destination logical channel specifier is used at the destination node to control routing of the packet within that node such as to a particular application.

The new procedures implemented in each packet switch of the network in accordance with our invention dictate the manner in which incoming packets are routed. If the incoming packet contains an alternate routing field, then the packet switch decrements the postage by one. If the resultant postage is negative, the packet dies. Ordinarily the postage value has been established at the originating node to a value high enough to allow the packet to reach its destination. Killing packets which have exhausted their postage prevents both ad infinitum looping and the establishment of undesirably long paths. Packets terminated in this manner are retransmitted by the originating session layer and rerouted by the packet switches so as to avoid the fate of the original packet.

If the postage value remains nonnegative after being decremented, then routing of the packet proceeds as follows. The destination map index in the incoming packet is accessed by the packet switch and is used to look up the exit path information stored within the packet switch for that destination map. If there are no exit paths defined at this node for the indicated destination map, then the packet is deemed to have reached its destination node. In this case the directory giving the locations of the active sessions at this node is consulted in order to route the packet to the session indicated by the destination logical channel index within the packet.

If exit paths are defined for this destination map at this node, then the packet is not yet at its destination node and routing of the packet proceeds as follows. The destination map information stored within the packet switch is consulted to determine the criterion to be used in selecting among the allowed exit paths from this node for the destination map indicated by the destination map index within the packet. The criterion indicates one of four possible routine "algorithms" in accordance with our invention. The first algorithm provides fixed routing which allows alternate routing to always use the first element or path of the list in a fixed form. The second algorithm provides for routing on the failure of a path. This algorithm requires the complete failure of the existing path before other paths of the list are attempted. The third algorithm is termed routing on health. This algorithm attempts to find within the list of available paths the healthiest route and it allows gradations of health between absolute failure and absolute ideal working condition. The fourth algorithm provides equalized routing wherein the exit path chosen from the list of possible exit paths is always the next path in the list. This algorithm rotates among the available paths so as to uniformly spread the traffic over all of the listed paths. The outcome of all of these algorithms is an index identifying one of the exit paths defined at this node for this destination map. The packet is then routed on the selected exit path in a manner common to existing packet switches.

The fact that this alternate routing arrangement is implemented using new information added on a per packet basis means that the alternate routing arrangement can be regarded as a new layer of the X.25 protocol. This new layer interacts with the existing layers as next described. Each packet message sent on behalf of the session layer for a particular session has an alternate routing header inserted by the alternate routing layer at the originating node for this session. The alternate routing layer uses values for the destination map index, the destination logical channel index and postage that have been predefined by the system administrator for this particular session use. This information is inserted in the packet and it follows the packet throughout the network. It is used as described previously by intermediate nodes to route this packet through the network. The alternate routing header is stripped from the message when it reaches the final node. In other words, the alternate routing layer information is removed and the remainder of the packet is presented to the session layer at the destination node.

It should be noted that the alternate routing layer and its corresponding header have been designed to allow compatibility with existing networks and to allow existing networks to be upgraded to alternate routing with minimal effort. In particular, an alternate routing packet network may contain intermediate nodes which presently do not support alternate routing. Intermediate nodes which presently do not support alternate routing need only inspect the X.25 packet up to level three, the packet layer header. They need not read the alternate routing layer. Thus, a packet containing an alternate routing header can pass through such a node transparently. Furthermore, the alternate routing layer is distinguishable from X.25 session layer headers and is therefore, capable of being recognized by a session layer and stripped so that a destination session layer may also be easily modified to handle packets containing the alternate routing layer. This permits the invention to be used when only some nodes of the system are modified to operate in accordance with the invention. layers of the packet.

This alternate routing arrangement can thus be seen to provide the benefits of both the static and dynamic arrangements in the prior art without suffering the disadvantages of either. In particular, we have the ability to have dynamic routing which responds immediately to failed links so that the next packet to be sent, or the present packet if it is not able to be sent along one path, can immediatey find another path. Thus, we have dynamic decisions on a per packet basis rather than requiring a session originator to reestablish communication by using a different path.

We also have the advantage of the static controlled routing that allows constraints to be built into the routing tables by the system administrator. The reasons for this are, for example, to avoid certain paths which represent security risks or unacceptable for other reasons including anticipated traffic. In this alternate routing arrangement, most of the work in defining the routing is done by the network designer or system administrator at the time the network is installed. Many degrees of freedom are available to the system administrator in configuring the network. For example, the characteristics of the routes chosen for a particular session may be tailored to suit the characteristics of the users of those sessions. He may also select paths for a session which restrict the routing geographically in such a way as to provide increased security. The system administrator may choose, even for an individual session, an individual destination map containing many different routing algorithms and different nodes throughout the network to suit the different characteristics and the available facilities at these intermediate nodes of the network. This would mean for example, that an individual packet of a particular session could be routed, even though it carries the same destination map index for the life of the packet, so that different algorithms would be used on behalf of this packet at different nodes. Thus, a packet from a particular session could be routed through some nodes of the network using fixed routing whereas, through other nodes of the network may be routed on health, depending upon how the system administrator wishes to configure the network.

Thus, it can be seen that the disclosed alternate routing arrangement offers the advantages of dynamic routing on a per packet basis but without having the disadvantages of requiring a centralized controller or additional hardware or other complexities. It also does not require the updating of routing tables throughout the network since that is static information. Thus, no bandwidth in the network is consumed through this intercommunication or synchronization of data bases. Furthermore the alternate routing layer can work in between an existing session layer and a packet layer protocol.

BRIEF DESCRIPTION OF THE DRAWING

The invention and its advantages may be better understood from a reading from the following description of one possible exemplary embodiment thereof, taken in conjunction with the drawings in which:

FIG. 4 illustrates the format of a level 2 frame;
FIG. 5 illustrates the format of a level 3 packet;
FIG. 6 illustrates the format of the alternate routing layer of the invention;
FIG. 7 illustrates the format of a session layer data message;
FIG. 8 illustrates the format of a session layer control message;
FIG. 9 illustrates details of the level 3 header;
FIG. 10 illustrates the relative position of the alternate routing field within a complete level 2 information frame;
FIG. 11 illustrates the details of the alternate routing field;
FIG. 12 illustrates the relationship between the alternate routing layer and the X.25 layers;
FIG. 15 illustrates the data structure of a fixed network channel;
FIG. 16 illustrates the data structure of an alternate routing network channel;
FIG. 17 illustrates the data structure for the destination map components at a given packet switch;
FIG. 18 illustrates the data structure of the directory of active sessions at a given packet switch;
FIG. 19 illustrates the data structure used by a given packet switch to record the current exit path for each destination map;
FIG. 20 illustrates the process used to determine the number of defined routes and to examine the postage field;
FIG. 21 illustrates the process used to determine the routing algorithm to be used;
FIGS. 27-32 illustrate further details of the use of destination maps.

DETAILED DESCRIPTION

Figure 1:
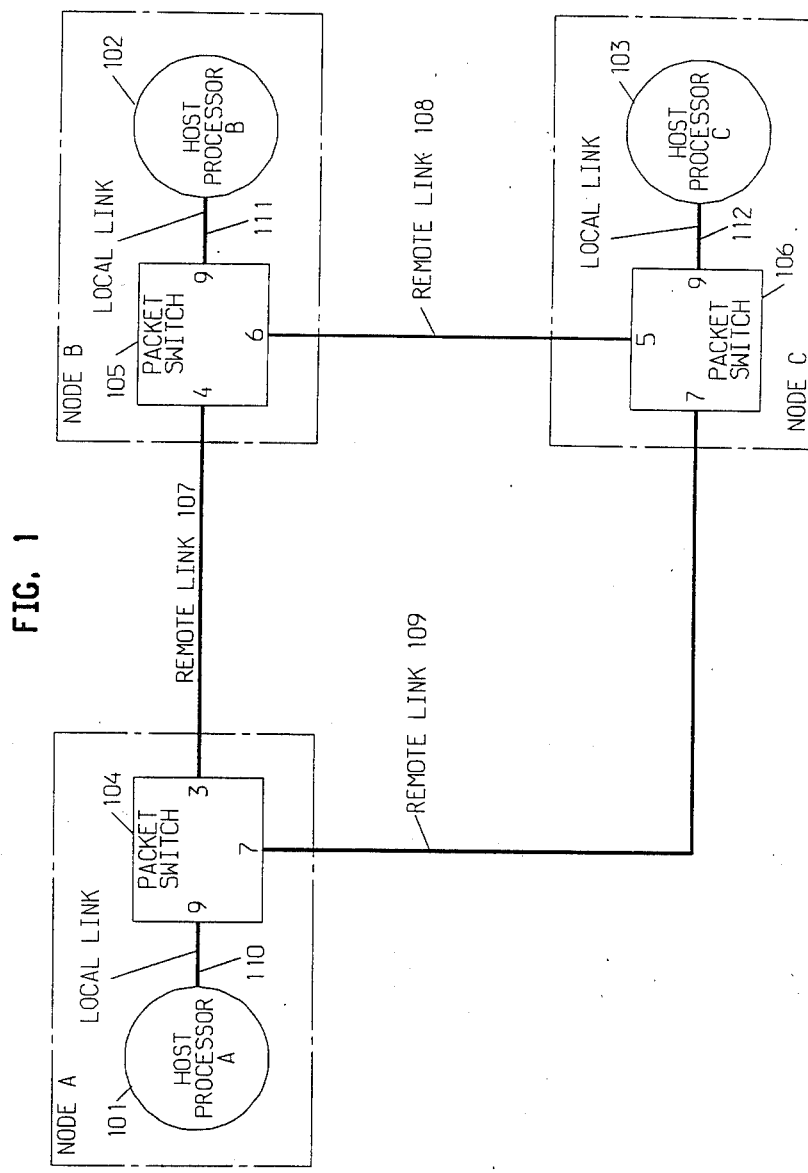
FIG. 1 illustrates a network embodying one possible embodiment of the invention.

FIG. 1 discloses one possible exemplary embodiment of the invention as comprising a packet switch network having packet switches 104, 105 and 106 connected to each other by remote links 107, 108 and 109. Packet switch 104 is also connected via local link 110 to host processor 101, packet switch 105 is connected via local link 111 to host processor 102 and packet switch 106 is connected via local link 112 to host processor 103. Host processors 101, 102 and 103 are also designated, respectively, as host processors A, B and C.

A host processor together with its associated packet switch comprises a node. Thus, host processor 101 and packet switch 104 comprise node A, host processor 102 and packet switch 105 comprise node B, and host processor 103 and packet switch 106 comprise node C. Each host processor performs many functions among which are the generation of application messages that must be transmitted over the network shown in FIG. 1 to the host processor of another node. Thus, host processor A generates messages which are sent to host processors B and C. Similarly, host processor B generates messages which are sent to host processors A and C, and host processor C generates messages which are sent to host processors A and B.

In the network shown in FIG. 1, which is simplified for the purpose of this discussion, node A may communicate directly with node B via remote link 107 or, alternatively, via remote link 109, packet switch 106 at node C and remote link 108 extending to node B. When packet switch 104, for example, receives a packet from host processor A that is destined for host processor B, packet switch 104 must determine whether the packet is to be sent directly to node B via remote link 107 or alternatively whether it is to be sent via remote links 109 and 108 through packet switch 106 acting as a tandem point. Each of packet switches 104, 105 and 106 may act as a tandem point in forwarding a packet from a first one of the other two nodes to the other one of the other two nodes. Thus, when packet switch 105 at node B receives a packet from node A via remote link 107, it must determine whether the packet is intended for host processor B at node B or, alternatively, whether the packet is destined for node C. If this latter situation is extant, then packet switch 105 functions as a tandem point and forwards the packet received on remote link 107 out over remote link 108 to packet switch 106 at node C.

The present invention relates to the manner in which each packet switch performs an alternate routing function by deciding whether a packet generated by its host processor is to be transmitted directly to the node to which it is destined or alternatively whether the packet is to be transmitted to the destination node via one or more tandem nodes. The invention further relates to the manner in which a packet received at a tandem node is processed by the packet switch at the tandem point and then transmitted out over a selected remote link towards the destination node. The invention further relates to the details of how the decision making process operates in each packet switch to determine the network path that is to be used in extending a packet under all possible system conditions that may be encountered. This decision making process also involves the decision as to whether a received packet is to be forwarded to another node or is to be forwarded via a local link to the host processor at the same node such as, for example, via local link 110 to host processor 101 at node A in FIG. 1.

Packet switch 104 contains the number identifiers 3, 7 and 9 associated with the three links extending out from the packet switch. Similarly, packet switch 105 has the three number identifiers 4, 6 and 9 while packet switch 106 has the three number identifiers 7, 5 and 9. The purpose of these identifiers is described subsequently in detail.

Figure 3:
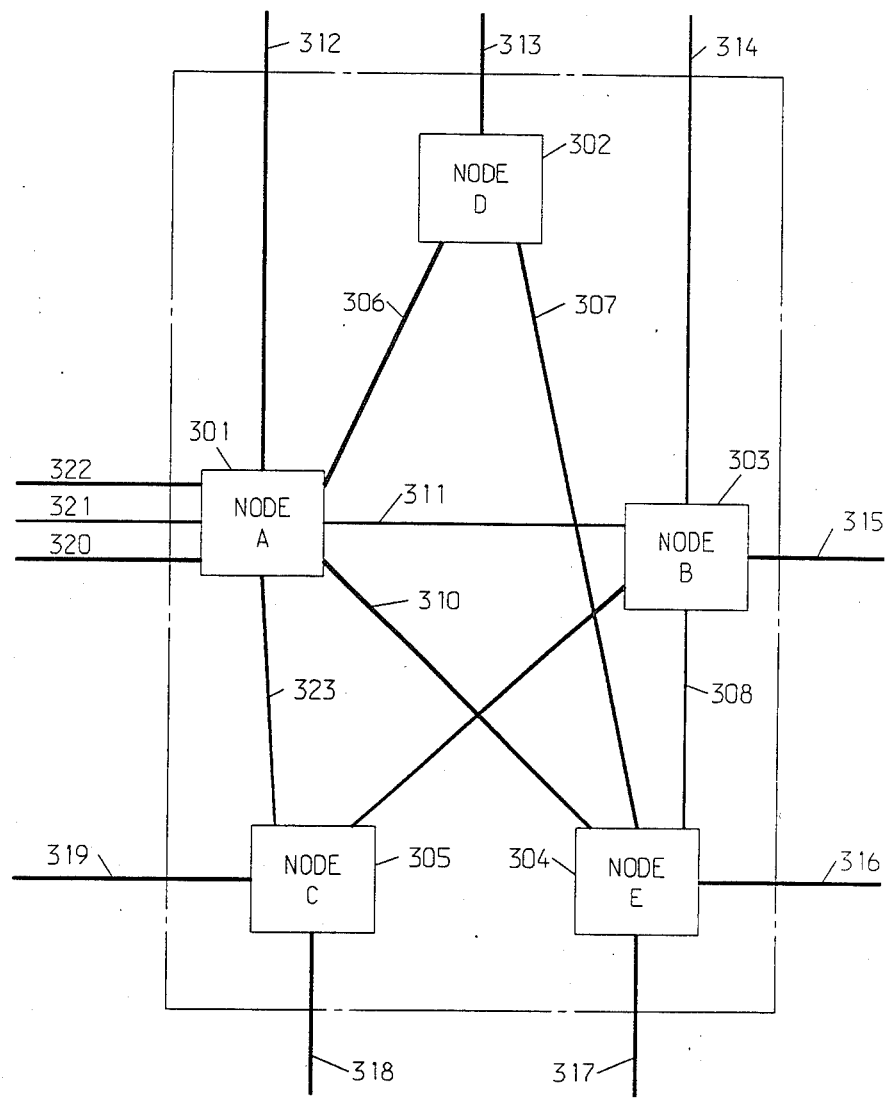
FIG. 3 illustrates a more complex network in which the invention could advantageously be used.

FIG. 3 discloses a subset of a more complex network utilizing the principles of the present invention. This subset or subnetwork comprises nodes A through E which comprise elements 301 through 305. The network further includes links 306 through 323. Each node is connected by a direct link to each of the other nodes and is further connected to each other node via a tandem connection comprised of two links and the packet switch of another node. Some of the links shown in FIG. 3 extend from nodes A through E to nodes that are not shown, but which comprise part of the overall network of which the subnetwork in FIG. 3 is but a part.

The routing decisions for the packet switching facilities at each node in the network of FIG. 1 are perhaps relatively simple and do not fully utilize the full sophistication of the principles of the present invention. However, with reference to FIG. 3 it may be seen that sophisticated alternate routing decisions must be made under certain system conditions in extending a packet received at a first node and destined for another node under circumstances in which the direct link between the two nodes is not available. For example, with respect to nodes A and B, the most obvious choice in extending a packet received by node A and destined for node B is to use link 311. However, under certain circumstances link 311 may not be available. In this case, node A has to determine the path to be used. The packet could be sent via node C operating as a tandem point. It could also be sent via node E operating as a tandem point or, alternatively, via a path beginning with link 306 and involving both nodes D and E operating as tandem points. Other choices may be available involving nodes not shown in FIG. 3. Under such circumstances, it may be seen that sophisticated decision making may be involved in determining the best possible path to be used under all possible system conditions in extending a packet received at a first node onward to a destination node. The principles of the present invention function to optimize this decision in such a manner as to provide the best possible service under all system conditions that may be encountered.

Figure 2:
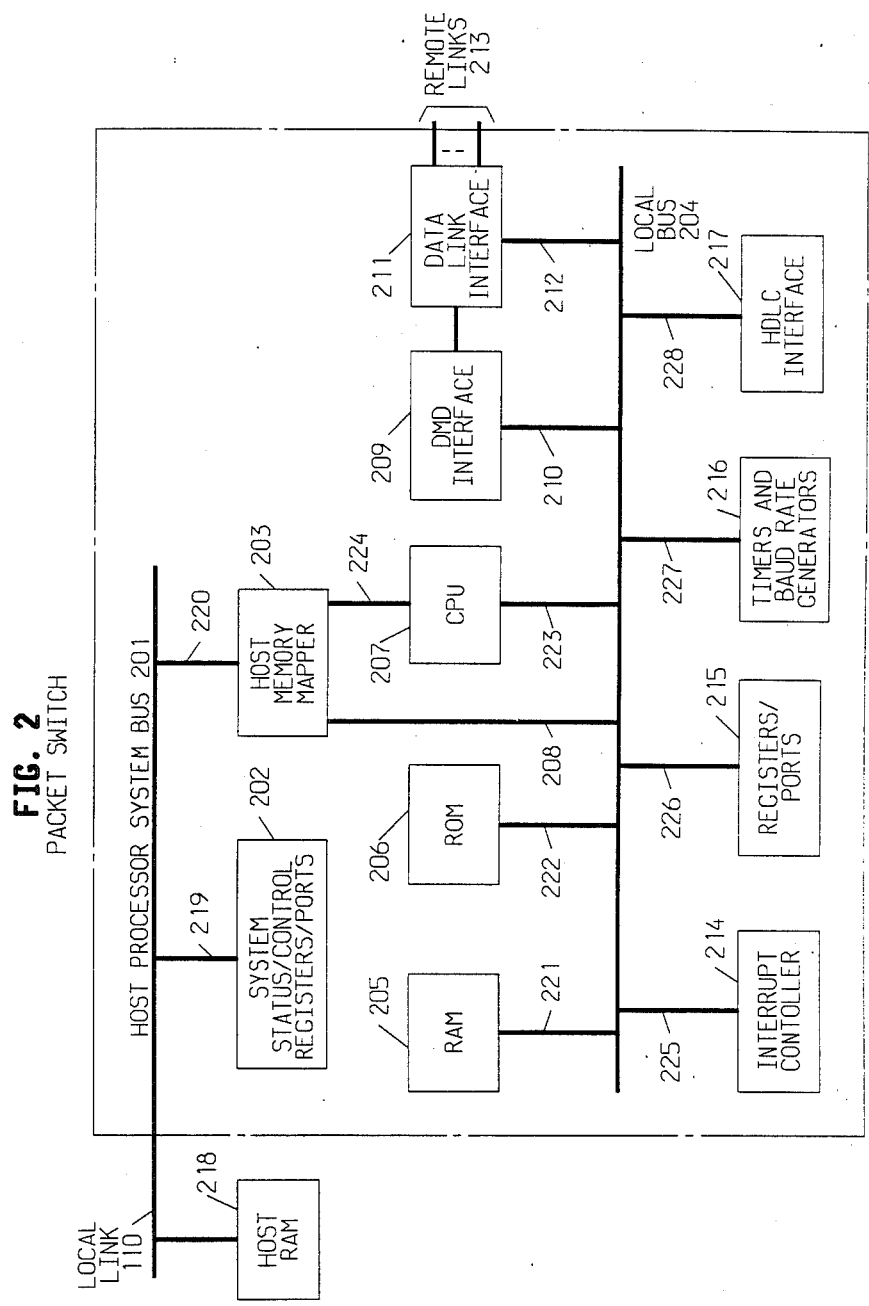
FIG. 2 illustrates further details of the packet switches of FIG. 1.

FIG. 2 discloses further details of packet switches 104, 105 and 106 of FIG. 1. A packet switch functions to receive session level information from its host processor, to convert this information into one or more packets, and to transmit each packet to a destination node and host processor. A packet switch also functions in the reverse direction to receive packets addressed to its node. In receiving these packets, the packet switch strips off the header and other protocol support information and passes the remainder as session level information to its host processor. A packet switch can also act as a tandem point and, in this case, the packet switch receives a packet addressed to another node, processes the packet, as subsequently described, and transmits it out over a link leading towards the destination node.

Further details of any one of packet switches 104, 105 or 106 in FIG. 1 are shown in FIG. 2. Assume FIG. 2 represents packet switch 104 of FIG. 1. The packet switch of FIG. 2 includes a host processor system bus 201, a local bus 204 and a plurality of equipments connected to each of these buses. The host processor bus 201 extends to the left and is the same as local link 110 of FIG. 1. On the left side of FIG. 2, RAM 218 of host processor 101 is connected to local link 110 and the host processor system bus 201. Connected to this host processor system bus 201 within the packet switch are system status/control registers 202, and host memory mapper 203. RAM 218 of the host processor stores the session level information that is transmitted over local link 110 and bus 201 to the packet switch of FIG. 2. The packet switch receives the session level information, converts it into one or more packets and transmits the packets out over one of the remote links 213 toward the destination node specified by the session level information provided by host RAM 218. Remote links 213 are the same as remote links 107, and 109 of FIG. 1. In the reverse direction, the remote links 213 receive packets addressed to the node packet switch and intended for its host processor 101. These packets are received, the header and other protocol support information is stripped from the packets and the remainder of the information is passed over bus 201 and local link 110 to the host RAM 218 as session level information. Registers 202 store various items of status and control information that is not directly involved in the conversion of session level information into packets and vice versa. The precise functions and duties of these registers is not material to an understanding of the present invention and is not further discussed in detail.

Host memory mapper 203 is connected via path 220 to system bus 201 and by path 208 to local bus 204. Also connected to local bus 204 is RAM 205, ROM 206, CPU 207, DMA interface 209, and data link interface 211. Further connected to BUS 204 is interrupt controller 214, registers/ports 215, timers and baud rate generators 216 and HDLC interface 217. Registers 215 are comparable to registers 202 and store the same type of information pertaining to the status and control of various portions of the packet switch of FIG. 2. The host memory mapper 203 operates on a direct memory access (DMA) basis between RAM 218 of host processor 101 and RAM 205 of the packet switch. It permits information to be transferred and exchanged directly on a DMA basis between these two memory elements.

The memory mapper 203 operates by effectively making host RAM 218 appear to be a part of the local memory space within RAM 205 and ROM 206. This is true with respect to the read and write operations. Thus, a memory mapper 203 permits information currently in host RAMs 218 to be read out and transferred directly on a DMA basis to RAM 205. Information may also be conveyed on a DMA basis in the reverse direction from RAM 205 to host RAM 218. ROM 206 stores permanent nonvolatile information which is used by the rest of the system including the CPU 207. ROM 206 and RAM 205 control the operation of the CPU so that it may perform its intended functions including those of receiving session level information from host RAM 218 and converting this information to packets which are sent over remote links 213 to a destination node. The CPU also controls the operation of the system when information is received in packetized form on remote links 213 that is intended for host RAM 218. The CPU, in this case, removes the protocol support information and passes the remainder on to the host RAM 218 via memory mapper 203, host bus 201 and local link 110.

The CPU also controls the operation of the system when the packet switch operates as a tandem point to receive a packet on a first remote link from an originating node and send the packet out over another link towards a destination node. The DMA interface 209 is provided to permit the data link interface 211 to operate on a DMA basis with respect to RAM 205. This is done when the interface 211 receives packets that are to be sent out over remote links 213 as well as when it receives packets from remote links 213. In transmitting the packets, RAM 205 provides the session level information while the remainder of the elements in FIG. 2 packetize this information and apply it through DMA interface 209 in packetized form to interface 211 for transmission out over a specified one of the remote links 213.

The process works in the reverse direction when data link interface 211 receives packetized information from a link. In this case, the protocol support information is stripped off and the session level information is transferred via DMA interface 209 and local bus 204 to RAM 205. All this is done under the control of ROM 206 and CPU 207. Interrupt controller 214 performs the conventional interrupt control functions required by any stored program machine. The timer and baud rate generators 216 provide the required timing and other control signals for the operation of the stored program machine of FIG. 2. The HDLC interface 217 provides the conventional functions of the level 2 HDLC protocol. Specifically, HDLC interface 217 performs the flag generation function, the CRC function, and the bit stuffing functions required in converting session level information to packetized form. HDLC interface 217 performs the reverse functions in stripping received packets of headers and other protocol support information so that the data portion of the received packet may be stored in RAM 205.

The remote links 213 are comparable to remote links 107, 108 and 109 of FIG. 1. The packet switches of FIG. 1, such as, for example, packet switch 104 are shown to have only two remote links each. In actual practice, a packet switch may have a greater number of remote links and thus more than two such links are shown for remote link 213 in FIG. 2. Node A in FIG. 3 has eight remote links extending therefrom and more typically corresponds to the plurality of links extending from data link interface 211 in FIG. 2.

FIG. 4 discloses the format in which information is sent in packetized form between nodes over the remote links. The network shown in FIG. 1 transmits information using the well known HDLC format of the X.25 data communications protocol over the remote links between nodes. One such frame of HDLC information is shown in FIG. 4. This frame contains an information field plus protocol support fields. These protocol support fields, beginning on the left side of FIG. 4, are a beginning flag field, an address field and a control field. Following the information field is a frame check sequence field and an ending flag field to indicate the end of the frame. The beginning flag field on the left indicates the start of a frame. The address field is used for distinguishing command frames from response frames. The control field contains commands and responses along with sequence numbers, when appropriate, as a means of performing link initialization, error control and flow control functions. The information field contains the data that it is to be transmitted between nodes. The frame check sequence field is used to detect errors that may occur during frame transmission, and implements the conventional Cyclic Redundancy Check (CRC) function. The ending flag field on the right indicates the end of the frame. The frame of FIG. 4 is in the HDLC format and is level two or the data link layer of the X.25 protocol.

FIG. 5 indicates the relationship between the data link layer (level 2) and the packet layer (level 3) of the X.25 protocol. The information field of FIG. 4 is expanded in FIG. 5 to show the level 3 packet and comprises a data field portion and a level three header portion.

The level three header field contains the customary protocol support fields. It also contains packet sequence numbers, a packet identifier and more importantly a logical channel number which identifies one of many logical channels that are multiplexed over a given physical link. The level three header in addition may contain recovery, flow control, sequencing, and error control information.

FIG. 9 discloses further details of the level three header field of FIG. 5. In FIG. 9, the level three header comprises a plurality of fields. Beginning at the left, the first is the "General Format Identifier", the next is the "Logic Channel Identifier", the next is the "Packet Send Sequence Number" and the next is the "Packet Receive Sequence Number". The general format identifier is a code specifying the packet type. The logical channel identifier is used for multiplexing purposes and indicates the logical channel of the physical link that is being used to transmit the packet. The packet send sequence number and packet receive sequence number are used for flow control, sequencing and error control purposes.

FIG. 6 discloses a new layer (the Alternate Routing Layer) provided by the invention and shows the manner in which the data field of FIG. 5 is subdivided into an alternate routing field and a session layer message. The alternate routing field, which is described subsequently in further detail, specifies various types of information regarding the received packet including how many nodes may be used in forwarding the packet to the destination node, as well as information indicating how alternate routes are to be selected if a primary and most preferred route is not available. The session layer data message portion of the FIG. 6 frame contains the information that constitutes the actual message for which the packet is being transmitted. In other words, the session layer message represents the information that the originating node generated for the purposes of having it reach the destination node.

Session layer messages may be of two types as shown in FIGS. 7 and 8. The session layer message may be an application or data type message as in FIG. 7 or may represent a control type message as in FIG. 8. The session layer messages of both FIGS. 7 and 8 contain a session layer header in their left portion and an application, or data or control message in the right portion. The data message portion of FIG. 7 represents the message that is to be transmitted to a particular application in the destination node. In FIG. 8, the right most field contains a control message whose purpose is to effect a specified control operation at the destination node.

FIG. 10 summarizes FIGS. 4 through 8 and discloses all fields of a frame as transmitted over the system of the invention. As shown in FIG. 10, and beginning with the left most field, the packet frame comprises a level two header as shown in detail in FIG. 4, a level three header as shown in FIG. 5, an alternate routing field as shown in FIG. 6, a session layer header as shown in FIGS. 7 and 8, an application message field representing the information to be transmitted to the destination node via the packet switches, and finally a level two trailer including a frame check sequence field. All of these fields shown in FIG. 10 represent what is termed the "Level Two Frame". The level three portion of the packet begins with the level three header on the left and ends with the application message field on the right. Thus, the level three packet comprises the information field portion of the level two frame as shown in FIGS. 4 and 5.

Further details of the alternate routing field of FIG. 6 are shown in FIG. 11. This alternate routing field (ARF) consists of four sub-fields which are an alternate routing field header (ARFH), a postage field, a destination map index field, and a destination logical channel index field.

The first sub-field of the ARF is the alternate routing field header (ARFH), which is always hexadecimal 40. Hexadecimal 40 is distinguishable from currently used session layer headers for both session layer data messages (FIG. 7) and session layer control messages (FIG. 8). This allows the session layer to distinguish an alternate routing message from a session layer message. If the session layer receives an alternate routing message it is not expecting, it can discard the message. The session layer can be very easily modified so that it recognizes an alternate routing message and merely strips the first four bytes of the message before proceeding as normal with the remainder of the message. Thus, it is easy to modify the session layer to implement the alternate routing layer.

The second sub-field of the ARF is the postage field. This sub-field is used to limit the number of nodes through which a packet can pass. This limits the lifetime of packets so that the network does not become clogged with packets that cannot reach their destination successfully within the specific number of nodes.

The third sub-field of the ARF is the destination map index. The fourth sub-field is the destination logical channel index. These two sub-fields are used by intermediate nodes in routing a packet to its destination node and then to a particular session address at that node. The destinatioon map index is address information specifying the node to which the packet is destined. The destination logical channel index provides the destination node with the specific session address within the node that the packet is to be delivered to. There is a one for one correspondence between a logical channel index, a session address and an application at a node.

A session address is an identifier for an individual application process on a host processor which allows it to communicate with peer application processes on other host processors within the same network. These application processes, for example at node B in FIG. 1, use different session addresses to communicate with peer application processes at nodes A and C. A one-to-one correspondence exists between the session addresses on a node and the logical channels on the local link between the host processor and packet switch comprising that node.

The relationship of the alternate routing layer of the present invention to the ISO (International Standards Organization) model and standard X.25 protocol layers is shown in FIG. 12. The application layer corresponds to the application layer of the ISO model. The presentation layer of the ISO model is not represented in the present invention. Below the application layer is the session layer, which corresponds to the session layer in the ISO model. Below the session layer is the alternate routing layer of the invention. Below the alternate routing layer is the X.25 packet layer which corresponds to the transport and network layers of the ISO model. Below the packet layer is the X.25 data link layer which corresponds to the data link layer of the ISO model. Below the data link layer is the X.25 physical layer which corresponds to the physical layer of the ISO model.

The alternate routing layer is a separate layer provided by the invention and is not merely a modification of either the session layer or the packet layer. It has been designed as a separate layer with reference to FIGS. 4 through 8 which show the header structures of each layer from the data link layer (level 2) through the session layer. Physically, the alternate routing layer is distinguishable as a separate layer in the terms of a distinct header. The packet layer (level 3) header and the session layer header is unaffected by the alternate routing header. Its physical structure makes it a separate layer of the protocol. Packets using the invention can exist in a network that supports level 3 of X.25 and the session layer of the ISO model in a transparent way. Assume, for example, node C in FIG. 1 does not support the alternate routing layer. Node C could be translated such that a fixed connection exists between a particular logical channel on remote link 109 and a particular logical channel on remote link 108. It would be possible for the session layer at node A to insert the alternate routing field into messages and then send these messages to node C. Node C would only interpret levels 1, 2 and 3 without examining or changing the alternate routing field. The message could then be directly sent on to node B through this fixed tandem point. The fact that the invention provides a separate alternate routing layer allows a mixture of non-alternate routing intermediate nodes and alternate routing intermediate nodes within the same network.

Alternate routing is a separate layer because processing at levels 1, 2 and 3 by each node is the same for packets using the invention as it is for fixed routing packets that do not use the invention. Fixed routing consists of a permanent association between one link logical channel pair and another link logical channel pair. That is, a packet received on the one link and logical channel is transmitted out on the other link and logical channel and vice versa. This type of fixed routing is based solely on link number and logical channel identifier and can be performed by referencing only level 3 of the protocol. At the higher layers of the protocol, the application layer and the session layer are kept intact despite the insertion of the alternate routing layer.

Figure 13:
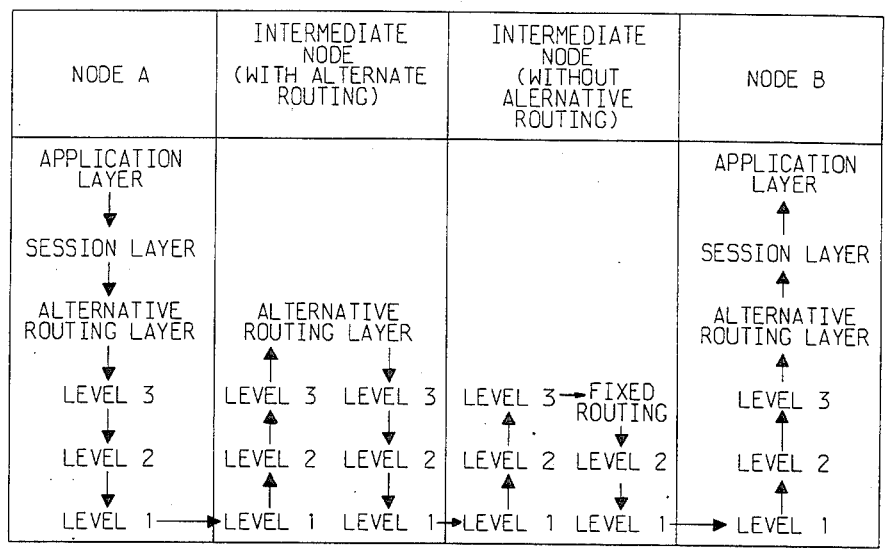
FIG. 13 illustrates how packets containing an alternate routing field layer may be processed by nodes not equipped for alternate routing.

Since the packet layer is kept intact, intermediate nodes in a network, as shown in FIG. 13, do not have to implement the alternate routing layer in order to be a part of an alternate routing network. The intermediate node of FIG. 13, which does not have alternate routing, strips level 2 and level 3 headers and interprets messages only up through the packet layer in order to use the fixed routing methods described subsequently to route the packet. It does not need to examine the alternate routing layer in the message. Therefore, the alternate routing layer passes through such a node transparently.

Figure 14:
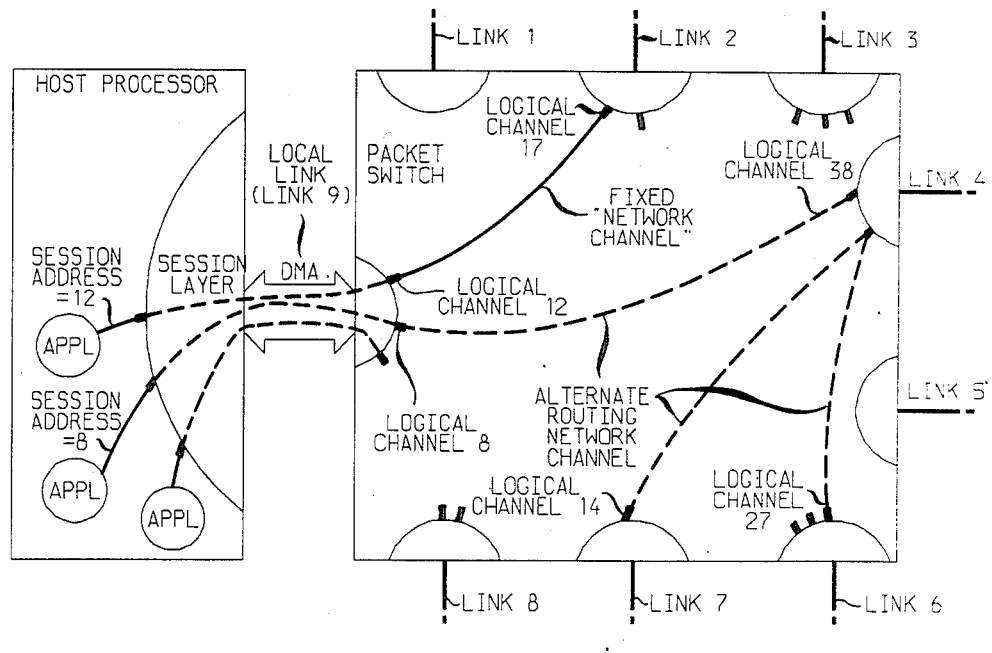
FIG. 14 illustrates the concept of a network channel within a packet switch.

FIG. 14 shows the network organization of a packet switch such as packet switch 104 in FIG. 1. The packet switch can be thought of as a separate element which is connected to a host processor via a local link that is the same as any of the physical links which are connected to the packet switch. Links 1 through 8 of FIG. 14 are the physical links. Link 9 is a local link which is implemented through direct memory access (DMA) to the host processor. The packet routing function of the packet switch is implemented by the establishment of network channels, which are described subsequently. Within the packet switch, there is a level 3 entity that terminates each of the nine links. Each level 3 entity provides multiple logical channels for the link that it is terminating.

The concept of a network channel is that, with respect to fixed routing algorithms in the prior art, there is a software association between one link logical channel pair, for example link 2 and paired logical channel 17, to a second link logical channel pair, for example link 9 and paired logical channel 12, as shown in FIG. 14. This association is implemented by storing the values 2,17 together with the values 9,12 in a table. Thus, a fixed network channel is a grouping of four different numbers and has the effect of associating two endpoints (communication paths) or connecting two endpoints in the same way that a patch cord connects two electrical points.

FIG. 15 shows in tabular form the definition of a fixed network channel. This fixed network channel definition dictates that a packet received on incoming link x and logical channel y will be routed to outgoing link x' and logical channel y'. For example, x,y is 2,17 and x',y' is 9,12 for the fixed network channel shown in FIG. 14. Also note that a network channel is bidirectional. That is, a packet received on incoming link x' and logical channel y' will be routed to outgoing link x and logical channel y.

The above describes the network channel structure used for fixed routing. This structure has been modified by the invention in the case of alternate routing, as is subsequently discussed, in order to provide a structure that does not route solely according to the identity of the incoming link and logical channel. That is, a packet can be routed in a manner which is dynamic and not dependent solely upon the incoming link and logical channel the packet is received on. To accommodate alternate routing, the definition of a network channel has been modified to allow routing based upon additional parameters and tables besides the fixed network channel parameter. In particular, an alternate routing bit has been added as shown in FIGS. 15 and 16. The alternate routing network channel shown in FIG. 16 is a network channel in which there is only one link and logical channel component as compared to the two link and logical channel components of the fixed network channel shown in FIG. 15. Note that in FIG. 15 the alternate routing bit has the value 0 for a fixed network channel. The network channel tables shown in FIGS. 15 and 16 are located physically in the packet switch RAM 205 in FIG. 3. A network channel is therefore a single entity consisting of three components: an alternate routing bit, an x,y component, and an x'y,' component. Note that the x'y' component is not needed for an alternate routing network channel.

The routing function of the packet switch and the packet routing function of the alternate routing layer can now be described. The case of fixed routing is described first. Assume an incoming packet is received on link x and logical channel y. The x,y pair is used by the packet switch to obtain the network channel associated with link x and logical channel y. This is accomplished by indexing into a table of network channels, using x, y as an index into that table. Next, the network channel's alternate routing bit is examined. If the alternate routing bit is 0, link x and logical channel y are part of a fixed network channel, as shown in FIG. 15. The x',y' component of the table is obtained from RAM 205 and the packet is routed to outgoing link x' and logical channel y'. The packet switch operates in a similar manner when an incoming packet is received on link x' and logical channel y'. In this case, the packet is routed to outgoing link x and logical channel y.

If the alternate routing bit is 1, link x and logical channel y are part of an alternate routing network channel, as shown in FIG. 16. The packet switch does not obtain the outgoing link and logical channel solely from the network channel as for FIG. 15, but instead uses the alternate routing field (ARF) that is contained in the packet (see FIG. 11). The packet switch first obtains the destination map index that is contained in the ARF. The destination map index of the ARF is used as address information or as an index into N route tables that are designated route-1, route-2, up through route-N, as shown in FIG. 17. These tables are physically located in the packet switch RAM 205 in FIG. 2. An entry in a route table is simply a link and logical channel component, similar to the x,y and x',y' components in a fixed network channel (FIG. 15). As shown in FIG. 17, the entries in the route tables are designated as x'1,y'1, x'2,y'2, up through x'n,y'n. Assume that N is equal to 3, that is, that there are three route tables: route-1, route-2 and route-3. Route-1, route-2, and route-3 are also referred to as the primary, secondary, and tertiary route tables, respectively. Also located within the route-1 table are two other fields, NRTS and ALG. The NRTS field in the route-1 table specifies the number of route tables (1, 2, or 3) that are defined for a particular destination map. The ALG field specifies the routing algorithm to be used for a particular destination map and may contain the value 0, 1, 2, or 3. The value 0 illustratively specifies fixed routing, the value 1 illustratively specifies routing on failure, the value 2 illustratively specifies routing on health, and the value 3 illustratively specifies equalized routing. The specified routing algorithm defines the criteria used in selecting between the primary, secondary or tertiary route tables in order to obtain an outgoing link and logical channel. The four routing algorithms are described subsequently in detail, with reference to the flowcharts shown in FIGS. 22, 23, 24, 25, and 26.

After obtaining the destination map index from the alternate routing field (ARF), the packet switch examines the postage field contained in the ARF (see FIG. 11). If the postage field is equal to zero, the packet switch discards the packet at that point. Otherwise, the packet switch decrements the postage field in the ARF. In this manner the network is able to limit the number of times a packet is routed by the packet switches. The packet switch next uses the destination map index to index into the route-1 table of FIG. 17 and obtains the number of route tables defined for the destination map (NRTS) as well as the routing algorithm to be used for the destination map (ALG). The link (x'i) in the route-1 table is then checked to see if it equals 9. A 9 specifies the local link to the host processor. If it is not equal to 9, the packet switch uses the number of routes defined and the specified routing algorithm to select a route table (route-1, route-2 or route-3) and obtains the outgoing link xi' and logical channel yi' from that route table, where i equals 1, 2 or 3. This selection process is subsequently described in detail. The packet is routed to outgoing link x'i and logical channel y'i. If the link (x'i) in the route-1 table equals 9, the packet is at the destination node and the packet switch must now determine the logical channel number on the local link between the packet switch and the host processor that the packet is to be routed over. The local link between the packet switch and the host processor is designated as link 9 in FIG. 14. This logical channel number is identical to the session address and corresponds to an application process on the host processor, for example, session address 8 in FIG. 14. The packet switch obtains the destination logical channel index contained in the ARF (see FIG. 11) and uses it as address information to index into the alternate routing fan out (ARFANOUT) table shown in FIG. 18. This table is physically located in the packet switch RAM 205 in FIG. 2. The value obtained from the ARFANOUT table specifies a logical channel number on the local link between the packet switch and the host processor, and is designated as y' in FIG. 18. Thus, the packet is routed to outgoing link 9 and logical channel y'.

The preceding discussion has summarized the processing performed by the packet switch of a node upon receipt of a packet that requires alternate routing. A more detailed description follows with reference to the flowcharts shown in FIGS. 20–26.

The flowcharts begin with FIG. 20 and represent the situation in which a packet has arrived at a node that supports alternate routing. Assume, with reference to FIG. 14 that the packet has been received on link 4 and either logical channel 31 or 38. Also assume that the packet switch of the node has determined that this is an alternate routing type of network channel (see FIG. 16) and that it must now determine the outgoing link and logical channel to which the packet is to be routed. Finally, referring to FIG. 17, assume that N is equal to three and therefore that there are three route tables: route-1, route-2 and route-3. Element 1 in FIG. 20 is the beginning of the alternate routing decision tree used by the packet switch to determine how to route the packet. As element 2 shows, the packet switch first obtains the destination map index from the alternate routing field (ARF) in the packet (see FIG. 11). The destination map index is compared to zero (element 3) to check its validity. If the destination map index equals zero, the packet switch returns failure as shown in element 4. Returning to failure results in the packet being immediately discarded by the packet switch. Assume a valid destination map index. The packet switch then obtains the postage from the ARF (see FIG. 11), as shown in element 5. The postage is compared to zero (element b) to determine if the packet can be routed further. If the postage equals zero, the packet switch returns failure as shown in element 7. Otherwise, the postage in the packet is decremented (element 6.5). Next, the packet switch obtains the number of routes defined for this destination map (NRTS) from the route-1 table (see FIG. 17), as shown in element 8. This is accomplished by accessing the entry in the route-1 table at the address of the "route-1 table + the destination map index". In other words, the desired entry in the route-1 table for this particular destination map index is obtained by indexing into the route-1 table at an offset equal to the destination map index. NRTS indicates how many different routes or alternatives are defined for leaving this particular node for this particular destination map. NRTS is compared to zero (element 9) to check its validity. If NRTS equals zero, the packet switch returns failure as shown in element 10. Otherwise, the flow of control proceeds to element 11 which is identical to element 12 in FIG. 21.

As element 13 in FIG. 21 shows, the link number in the route-1 table entry that was previously obtained (element 8 in FIG. 20) iscompared to 9. Link 9 refers to the local link between the packet switch and the host processor as shown in FIG. 14. If the link number in the route-1 table entry equals 9 (element 14), the packet is at its destination node in the network and is to be routed to the host processor at that node. This path would be followed if the packet was received on link 4 and logical channel 38, as shown by a dotted line in FIG. 14. The method by which logical channel 8 on link 9 is chosen is described subsequently, beginning with element 21 in FIG. 22. If the link number does not equal 9, the packet is not at its destination node in the network, and control proceeds to element 15. This path is followed if the packet is received on link 4 and logical channel 31, as shown by another dotted line in FIG. 14. The packet switch obtains the routing algorithm (ALG) from the route-1 table entry that was previously obtained (element 8 in FIG. 20), as shown in element 15. This is the routing algorithm that is to be used for this destination map at this particular node to select the route by which the packet is to exit the node. The routing algorithm (ALG) to be used may have the value 0, 1, 2, or 3. The value 0 specifies fixed routing, the value 1 specifies routing on failure, the value 2 specifies routing on health, and value 3 specifies equalized routing. The flow of control transfers according to the routing algorithm, as shown in elements 16, 17, 18 and 19. The routing algorithms are described subsequently with reference to FIGS. 23–26.

Figure 22:
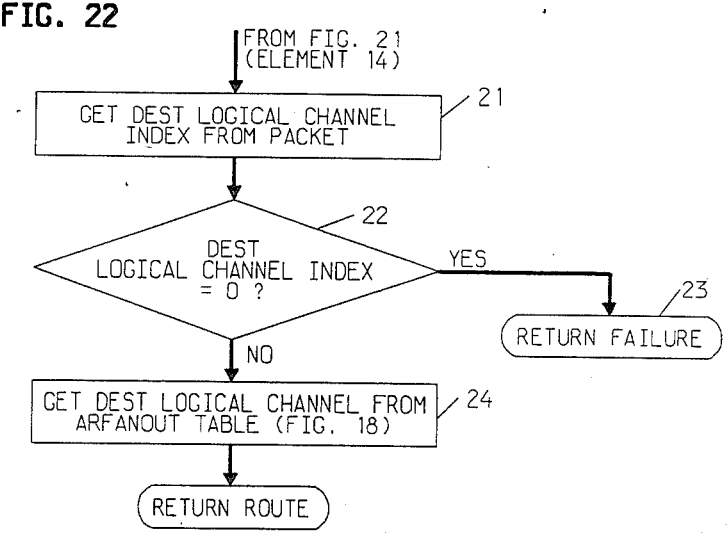
FIG. 22 illustrates the process used to test the destination logical channel index.
Figure 23:
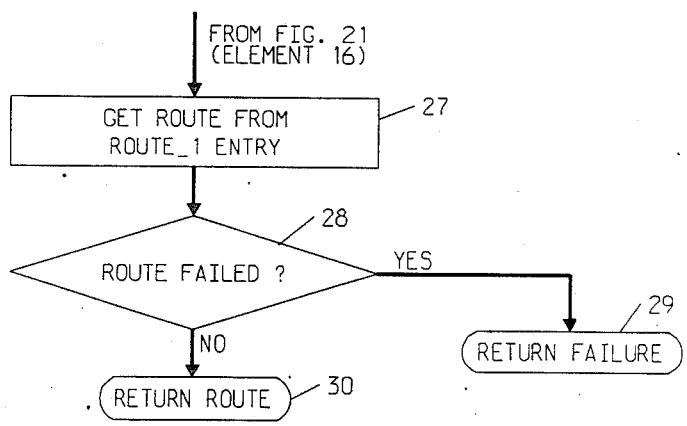
FIG. 23 illustrates the "fixed routing" algorithm.

On FIG. 22 element 21, it has been determined that the packet is at its destination node in the network. This is the path that would be followed if the packet was received on link 4 and logical channel 38 of FIG. 14. The packet switch must now determine the logical channel on the local link between the packet switch and the host processor (link 9 in FIG. 14). As element 21 shows, the packet switch obtains the destination logical channel index from the alternate routing field (ARF) in the packet (see FIG. 11). The destination logical channel index is compared to zero (element 22) to check its validity. If the destination logical channel index equals zero, the packet switch returns to failure as shown in element 23. Returning failure results in the packet being immediately discarded by the packet switch. Assuming a valid destination logical channel index, the packet switch uses the destination logical channel index to index into the alternate routing fanout table (ARFANOUT), shown in FIG. 18. The entry obtained from the ARFANOUT table (element 24) is the logical channel number on the local link between the packet switch and the host processor and is shown as logical channel 8 on link 9 in FIG. 14. In element 25 the packet switch returns the identified route and the alternate routing decision tree has been successfully completed. That is, the packet switch has determined the outgoing link (9) and logical channel (8) over which the packet is to be routed. On FIG. 14, the packet that was received on link 4 and logical channel 38 is routed over outgoing link 9 and logical channel 8. Logical channel 8 is identical to the session address on the host processor and corresponds to an application process on the host processor, as shown in FIG. 14.

Following is a description of the processing performed by the packet switch of a node receiving a packet upon determination that the packet is not at its destination node in the network and therefore, is not destined for the host processor at this node. This is the case for a packet that is received by a node on link 4 and logical channel 31, as shown in FIG. 14. In element 15 of FIG. 21, the routing algorithm to be used is obtained from the route-1 table of FIG. 17. The packet switch now uses the specified routing algorithm to determine the outgoing link and logical channel to which to route the packet. Four routing algorithms are discussed beginning with routing algorithm 0, or fixed routing.

Fixed routing does not provide for alternate routing and it specifies that the route to be used is directly obtained from the route-1 table. As shown in FIG. 17, the route to be used is outgoing link (x'i) and logical channel (y'i). In element 27 in FIG. 23, which shows fixed routing, the packet switch obtains the route from the route-1 table of FIG. 17. This is accomplished by using the destination map index, obtained in element 2 in FIG. 20, to index into the route-1 table. The packet switch determines if the route has failed, as shown in element 28. A route is determined to have failed if: (1) the outgoing link and logical channel comprising the route is identical to the incoming link and logical channel on which the packet was received, (2) the current level 2 protocol state for the outgoing link is not an information transfer state, (3) the current level 3 protocol state for the level 3 entity corresponding to the outgoing link is not an initialized state, or (4) the current level 3 protocol state for the outgoing logical channel is not a data transfer state.

If the route has failed, the packet switch returns failure as shown in element 29. This results in the immediate discard of the packet. If the route has not failed, the packet switch returns the route, as shown in element 30. That is, the packet switch has determined the outgoing link and logical channel to which to route the packet. On FIG. 14, the packet that was received on link 4 and logical channel 31 is now routed to outgoing link 6 and logical channel 27 if this is the route contained in the route-1 table for the given destination map (see FIG. 17).

Algorithm 1, the routing on failure algorithm, specifies that the route used to route the packet rom the node should be the same as the route used by the node to route the last packet which contained the same destination map index (see FIG. 11) unless that route has since failed. If that route has failed, the first non-failed route beginning with the primary route (located in the route-1 table) is used to route the packet. The criteria used by the packet switch to determine if a route has failed was priorly described with reference to FIG. 23. The current route associated with a given destination map is stored in the CURRENT-ROUTE table as the current route index (see FIG. 19). The current route index is simply an identifier (1, 2 or 3) that specifies the route table (route-1, route-2, or route-3) from which the outgoing link and logical channel was obtained to route the last packet containing a given destination map index. Since route-1 is the primary route table, the current route index associated with each destination map is initialized to 1 by the packet switch, whenever the packet switch processor (CPU 207 in FIG. 2) is reset.

Figure 24:
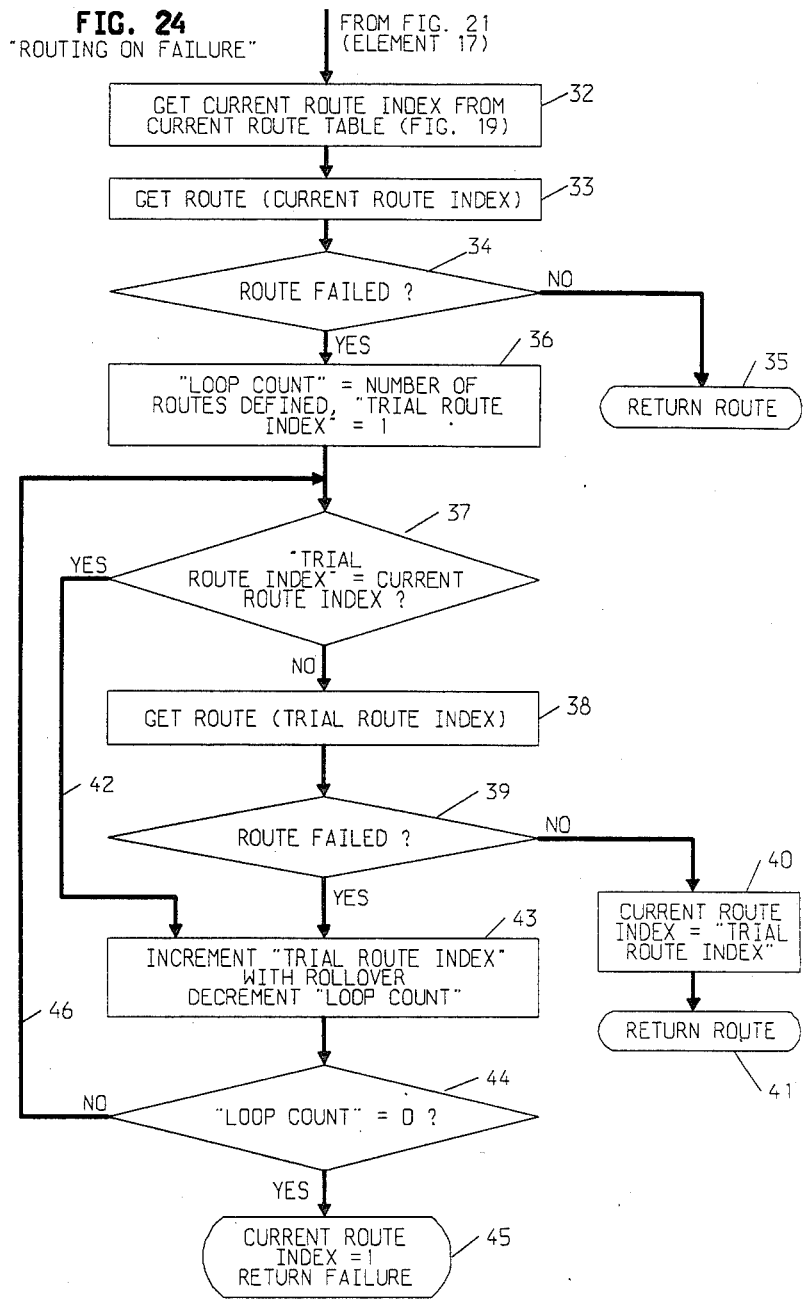
FIG. 24 illustrates the "routing on failure" algorithm.

The routing on failure algorithm is described in FIG. 24. As shown in element 32, the packet switch obtains the current route index associated with the destination map from the CURRENT-ROUTE table (FIG. 19). The current route index has the value 1, 2, or 3. Next, the route associated with the current route index is obtained from the route table (route-1, route-2, or route-3) that corresponds to that current route index (element 33). The packet switch determined if the indicated route has failed, as shown in element 34. If the route has not failed, the packet switch returns this route (element 35). If the route has failed, the packet must now search for the next defined route that has not failed, beginning with the primary route (located in the route-1 table).

The process of selecting a new route begins with element 36 in FIG. 24. Two temporary variables are initialized in element 36. These temporary variables are used only during the execution of the flowchart shown in FIG. 24. The "loop count" is set equal to the number of routes defined for the destination map (NRTS). NRTS was obtained by the packet switch in element 8 of FIG. 20. The "trial route index", which is used in the same manner as the current route index, is set equal to 1. The "trial route index" thus corresponds to a route table (route-1, route-2, or route-3). It is set equal to 1 so that the primary route (located in the route-1 table) is checked first by the packet switch in its search for a new non-failed route. This search is executed via a loop that begins with element 37 and ends with element 44. Since "loop count" equals NRTS, the loop will execute a maximum of NRTS times. Since there are assumed to be three route tables (route-1, route-2, and route-3), the maximum value of NRTS for any destination map is 3. Therefore, the maximum value of "loop count" is 3. As shown in FIG. 14, there are two alternate routes associated with incoming link 4 and logical channel 31. The two alternate routes, which are associated with a particular destination map, are link 6-logical channel 27, and link 7-logical channel 14. These two routes are the entries in the route-1 and route-2 tables, respectively, for that destination map (see FIG. 17). The route-3 table does not contain an entry for this destination map. In this particular example, NRTS and thus "loop count" are equal to 2. As shown in element 37, the packet switch compares the "trial route index" with the current route index associated with the destination map. If the two values are equal, control proceeds via path 42 to element 43. This branch is taken since the route associated with the current route index has already been checked in element 34, and has been determined to have failed. If the two values are not equal, the route associated with the "trial route index" is obtained from the corresponding route table (route-1, route-2, or route-3), as shown in element 38. The packet switch determines if the route has failed, as shown in element 39. If the route has not failed, it will be the route used by the packet switch to route the packet, and control proceeds to element 40. As shown in element 40, the current route index associated with the destination map is updated in the CURRENT-ROUTE table (FIG. 19) to reflect the selection of a new route. This is accomplished by setting the current route index associated with the destination map in the CURRENT-ROUTE table equal to the value of "trial route index". The packet switch then returns the route, as shown in element 41. The packet is then transmitted over this route. In element 39, if the route just obtained has failed, control proceeds to element 43. As shown in element 43, the "trial route index" is incremented with rollover. That is, if the "trial route index" is 1 it increments to 2, if it is 2 it increments to 3, and if it is 3 it rolls over to 1. The "loop count" is decremented, as is also shown in element 43. The packet switch then compares the "loop count" to zero in element 44. If the "loop count" does not equal zero, there are other defined routes that have not yet been checked, and control proceeds via path 46 back to element 37 to continue the search for a new non-failed route. If the "loop count" equals zero, all defined routes have been checked and control proceeds to element 45. In element 45, the current route index associated with the destination map is set equal to 1 in the CURRENT-ROUTE table. This is done so that when the next packet with the same destination map index arrives, the packet switch will first check the primary route (contained in the route-1 table), as shown in elements 32-34. Finally, as is also shown in element 45, the packet switch returns failure since all defined routes for the destination map have failed.

There is an additional situation, not covered by the routing on failure algorithm flowchart (FIG. 24), which causes the current route index associated with a given destination map in the CURRENT-ROUTE table (FIG. 19) to be changed by the packet switch. The situation occurs when the packet switch does not receive confirmation of the receipt of a packet by the packet switch at the opposite end of the link on which the packet was routed. The confirmation of packets is a standard part of level 3 of the X.25 protocol. After routing a packet, the packet switch stores a copy of the packet in its local memory (RAM 205 in FIG. 2) until the receipt of the packet is confirmed by the packet switch at the opposite end of the link. The current route index identifying the route table (route-1, route-2, or route-3) that was used to obtain the route for the packet is also stored along with the packet in the packet switch's local memory. If the packet is not confirmed, the packet switch compares the current route index stored with the packet to the current route index associated with the destination map in the CURRENT-ROUTE table (FIG. 19). If the two values are equal, it indicates that the current route index associated with the destination map is still the same as it was when the packet was originally routed. If this is indeed the case, the packet switch increments the current route index associated with the destination map in the CURRENT-ROUTE table to the next route that has not failed, in a manner similar to the routing on failure algorithm loop just described. This action insures that the next packet containing the same destination map index will be routed by the packet switch using a route different from the route used by the unconfirmed packet.

Figure 25:
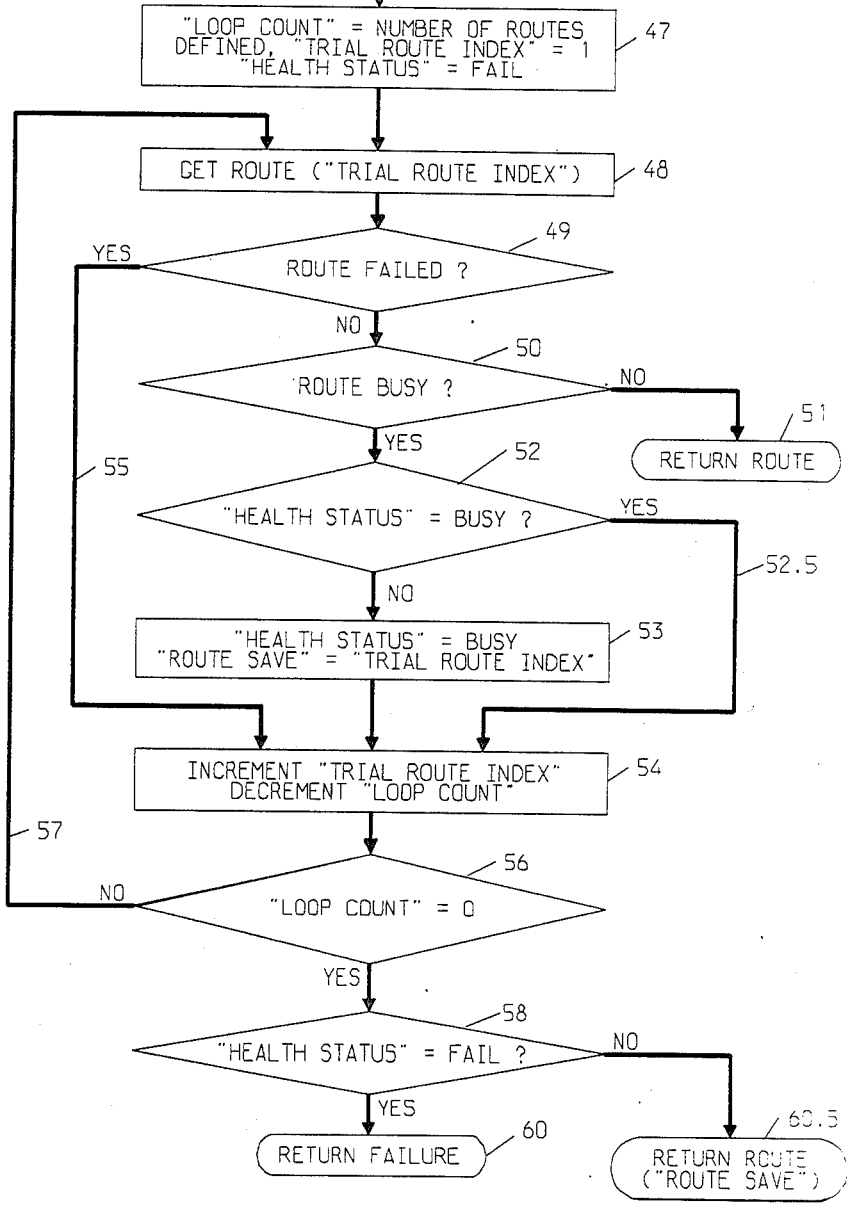
FIG. 25 illustrates the "routing on health" algorithm.

Algorithm 2, the routing on health algorithm of FIG. 25, specifies that the healthiest defined route for the destination map should be used by the packet switch to route the packet. The state of health of a route is defined as either good, busy, or failed. The criteria used by the packet switch to determine if a route has failed was described previously with reference to FIG. 23. The criteria used by the packet switch to determine if a route is busy is described subsequently. A good route is simply a route that has not failed and is not busy. A good route is healthier than a busy route, which in turn is healthier than a failed route. Using this algorithm, the packet switch selects the first defined route for the destination map, beginning with the primary route (located in the route-1 table), that has a state of health equal to good. If a good route does not exist in any of the tables of FIG. 17, the packet switch selects the first defined route that has a state of health equal to busy. If neither a good route nor a busy route exists, all defined routes for the destination map have failed and the packet switch returns failure. Note that in contrast to the routing on failure algorithm (algorithm 1), the routing on health algorithm does not reference the route used by the last packet which contained the same destination map index (see FIG. 11). Thus, the routing on health algorithm results in a higher probability of switching back and forth between routes since the state of health of the defined routes can change on a dynamic basis.

The routing on health algorithm is shown in FIG. 25. As shown in element 47, three temporary variables are defined. These temporary variables are used only during the execution of the flowchart shown in FIG. 25. The "loop count" is set equal to the number of routes defined for the destination map (NRTS). NRTS is assumed to be 3 and was obtained by the packet switch in element 8 in FIG. 20. The "trial route index", which corresponds to a route table (route-1, route-2, or route-3 in FIG. 17), is set equal to 1 so that the primary route (located in the route-1 table) is checked first by the packet switch in its search for the healthiest defined route for the destination map. This search is executed via a loop that begins with element 48 and ends with element 56. Since "loop count" equals NRTS, the loop will execute a maximum of NRTS times. Since there are assumed to be three route tables (route-1, route-2, and route-3), the maximum value of NRTS for any destination map is 3. Therefore, the maximum value of "loop count" is 3. The "health status" is set equal to FAIL, as is also shown in element 47. The "health status" may contain either the value FAIL or BUSY, and is used to indicate the state of health of the healthiest route that has been found thus far by the packet switch in its search for the healthiest defined route for the destination map. The actual numeric values corresponding to FAIL and BUSY are arbitrary and not relevant to the present discussion. As shown in element 48, the route associated with the "trial route index" is obtained from the corresponding route table (route-1, route-2, or route-3). The packet switch determines if the route has failed, as shown in element 49. If the route has failed, control proceeds via path 55 to element 54 to continue the search for the healthiest defined route for the destination map. If the route has not failed, the packet switch determines if the route is busy in element 50. A route is determined to be busy if: (1) the level 2 window for the outgoing link component of the route is full, (2) the level 2 protocol state for the outgoing link indicates the packet switch at the opposite end of the outgoing link is unable to receive level 2 information frames on that link, (3) the level 3 window for the outgoing logical channel component of the route is full, or (4) the level 3 protocol state for the outgoing logical channel indicates the packet switch at the opposite end of the outgoing link is unable to receive level 3 data packets on that logical channel. The level 2 window for a link is defined as the number of unacknowledged information frames that are outstanding at any given time on the link (see FIG. 4). The level 2 window is considered full when this number reaches a pre-defined maximum. Similarly, the level 3 window for a logical channel is defined as the number of unacknowledged data packets that are outstanding at any given time on the logical channel (see FIG. 5), and is also considered full upon reaching a pre-defined maximum.

In element 50, if the route just obtained is not busy, it implies that the route is good. Therefore, this is the route that the packet switch will use to route the packet and control proceeds to element 51. As shown in element 51, the packet switch returns the route just obtained.

If the route just obtained is busy (element 50), control proceeds to element 52. As shown in element 52, the packet switch compares the "health status" with the value BUSY. If the value of the "health status" equals BUSY, control proceeds via path 52.5 to element 54. This branch is taken if a busy route has already been found during a previous traversal of the loop. If the value of the "health status" does not equal BUSY, it must be equal to FAIL since it is a binary variable. Therefore, this is the first busy route that has been found and control proceeds to element 53. In element 53, the "health status" is set equal to BUSY, since a busy route has now been found. A new temporary variable, "route save", is set equal to the current value of the "trial route index", as is also shown in element 53. "Route save" thus corresponds to the route table (route-1, route-2, or route-3) from which the busy route was just obtained. This is the route that will be used by the packet switch to route the packet if a good route is not found. As is shown in element 54, the "trial route index" is incremented and the "loop count" is decremented. The packet switch then compares the "loop count" to zero, in element 56. If the "loop count" does not equal zero, there are other defined routes for the destination map that have not yet been checked, and control proceeds via path 57 back to element 48 to continue the search for the healthiest defined route for the destination map.

If the "loop count" equals zero, all defined routes for the destination map have been checked, and control proceeds to element 58. The packet switch then compares the "health status" with the value FAIL, as shown in element 58. If the value of the "health status" equals FAIL, all defined routes for the destination map have failed, and the packet switch returns failure as shown in element 60. If the value of the "health status" does not equal FAIL, it must be equal to BUSY, and control proceeds to element 60.5. The first busy route that was found is located in the route table (route-1, route-2, or route-3) corresponding to the value in "route save". The packet switch returns this route, as shown in element 60.5.

Algorithm 3, or the equalized routing algorithm, specifies that when routing packets with a given destination map index (see FIG. 11), the packet switch should alternate between the defined routes for that destination map in a circular, round robin manner. That is, if three route tables are defined for a particular destination map (see FIG. 17), the first packet containing that destination map index would be routed using the route contained in route-1, the second packet would use the route contained in route-2, the third packet would use the route contained in route-3, the fourth packet would use the route contained in route-1, and so on. If a selected route has failed, that route should not be used. Instead, the next non-failed route in sequence should be used by the packet switch to route the packet.

Figure 26:
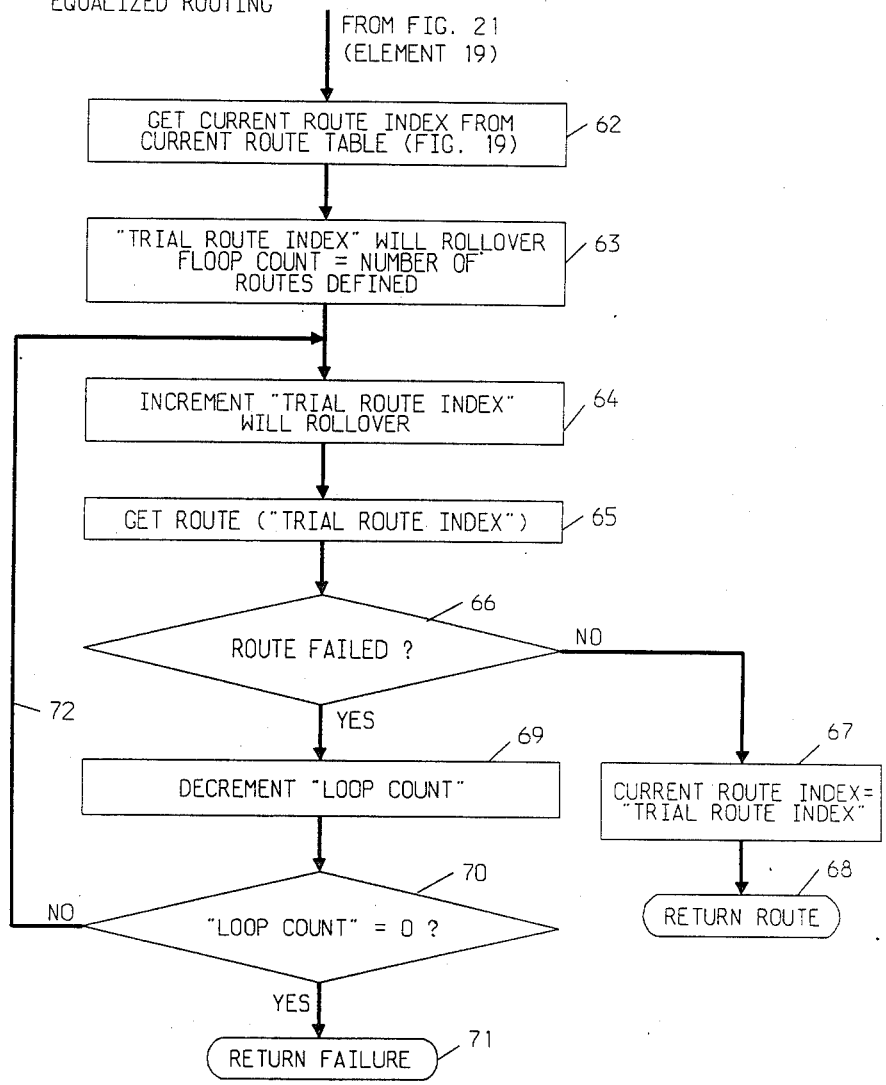
FIG. 26 illustrates the "equalized routing" algorithm.

The equalized routing algorithm is shown in FIG. 26. In element 62 the packet switch obtains the current route index associated with the destination map from the CURRENT-ROUTE table (see FIG. 19). The current route index has the value 1, 2, or 3. It identifies the route table (route-1, route-2, or route-3 in FIG. 17) from which the outgoing link and logical channel was obtained to route the last packet containing the same destination map index. Two temporary variables are initialized in element 63. These temporary variables are used only during the execution of the flowchart shown in FIG. 26. The "loop count" is set equal to the number of routes defined for the destination map (NRTS). NRTS was obtained by the packet switch in element 8 in FIG. 20. The "trial route index", which is used in the same manner as the current route index, is set equal to the current route index. The "trial route index" thus corresponds to the route table (route-1, route-2, or route-3) that contains the route used by the packet switch to route the last packet containing the same destination map index. The packet switch will search for the next non-failed route in sequence. This search is executed via a loop that begins with element 64 and ends with element 70. Since "loop count" equals NRTS, the loop will execute a maximum of NRTS times. Since there are three route tables (route-1, route-2, and route-3), the maximum value of NRTS for any destination map is 3. Therefore, the maximum value of "loop count" is 3.

The search for the next non-failed route in sequence begins with element 64 in FIG. 26. As shown in element 64, the "trial route index" is incremented with rollover. That is, if the "trial route index" is 1 it increments to 2, if it is 2 it increments to 3, and if it is 3 it rolls over to 1. The "trial route index" now corresponds to the next route table in sequence (route-1, route-2, or route-3). As shown in element 65, the route associated with the "trail route index" is obtained from the corresponding route table (route-1, route-2, or route-3). The packet switch determines if the route has failed in element 66. The criteria used by the packet switch to determine if a route has failed was described previously with reference to FIG. 23. If the route has not failed, it will be the route used by the packet switch to route the packet, and control proceeds to element 67. In element 67 the current route index associated with the destination map is updated in the CURRENT-ROUTE table (FIG. 19) to reflect the selection of the next non-failed route in sequence. This is accomplished by setting the current route index associated with the destination map in the CURRENT-ROUTE table equal to the value of "trial route index". The packet switch then returns the route, as shown in element 68.

In element 66, if the route just obtained has failed, control would proceed to element 69. The "loop count" is decremented, as shown in element 69. The packet switch then compares the "loop count" to zero, as shown in element 70. If the "loop count" does not equal zero, there are other defined routes that have not yet been checked, and control proceeds via path 72 back to element 64 to continue the search for the next non-failed route in sequence. If the "loop count" equals zero, all defined routes have been checked and control proceeds to element 71. As shown in element 71, the packet switch returns failure since all defined routes for the destination map have failed.

In the preceding discussions, the concept of a destination map has been described from the narrow perspective of a single node, where it appears as an index into the route tables (see FIG. 17); or of a single packet, where it appears as the third byte of the alternate routing field (see FIG. 11). The following discussion describes the concept of a destination map from the broader perspective of the entire network.

Figure 27:
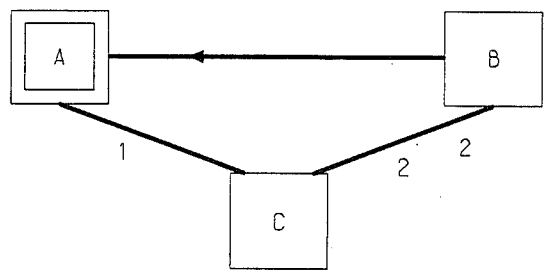
Figure 28:
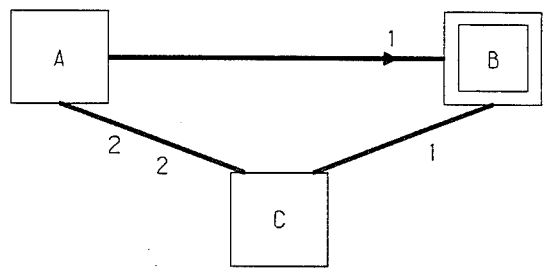
Figure 29:
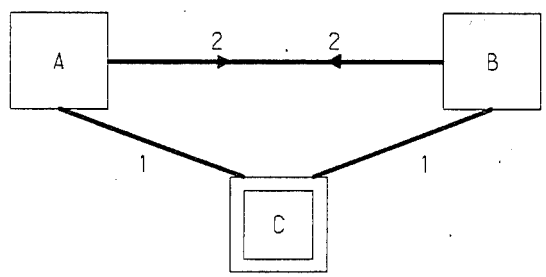

The simplest, nontrivial examples of destination maps are shown in FIGS. 27, 28 and 29 for a 3 node alternate routing network. As mentioned earlier, there are at least as many destination maps defined in a network as there are nodes in the network. In this example, three destination maps have been defined.

The destination map shown in FIG. 27 illustrates the preferred ways to get to node A from all other nodes of the network. The numbered arrows (1,2) emanating from the other nodes indicate the preferred exit paths from those nodes (1=primary, 2=secondary) given that the ultimate destination is node A. Similarly, FIGS. 28 and 29 show destination maps leading to nodes B and C, respectively.

The diagrammatic information in FIGS. 27, 28 and 29 is converted into numerical form in FIG. 30, which shows the values stored in the route tables (route-1, route-2 and route-3) at all three nodes of the network. The correspondence between the numbers in FIG. 30 and the diagrams in FIGS. 27, 28 and 29 is based on the link numbering scheme used in FIG. 1. This numbering scheme is locally defined at each packet switch. Thus, for packet switches 104 and 105 serving host processors A and B, respectively in FIG. 1, remote link 107 between node A and node B is labeled as link 3 with respect to packet switch 104, and is labeled as link 4 with respect to packet switch 105. Link 9 is always the local link to the host processor. Remote links are numbered between 1 and 8 with regard to this particular implementation.

The data shown in FIG. 30 are organized as follows. Everything in the major column labeled "At Node A" represents data stored in the route tables within the packet switch located at node A. Each minor column shows the data in a particular route table (route-1, route-2, or route-3) at that particular node. A specific destination map corresponds to a specific offset within all route tables at all nodes of the network. Thus, each row of FIG. 30 describes an individual destination map. For example, the destination map leading to node A shown diagrammatically in FIG. 27 corresponds to the top row labeled "Map A" in FIG. 30. The values 9, 0, 0, respectively of route-1, route-2, and route-3 at node A indicate that node A is the destination node for this destination map, and cause the packet switch at node A to route packets containing this destination map index to the host processor at node A over local link 9. In the second major column, the values 4, 6, 0 in the route tables at node B indicate that the first choice for getting to node A from node B is to use link 4, the second choice is to use link 6, and a third choice is not defined. Similarly, the values in the first row of the third major column indicate the choices for getting to node A from node C. Finally, rows 2 and 3 in FIG. 30 correspond to the destination maps shown diagrammatically in FIGS. 28 and 29, respectively.

It is clear from the above example that a destination map, whether described diagrammatically or numerically, consists of components at every node of the network and that each component is defined in terms that are local to that node. Although not explicitly mentioned in the above example, the destination map component at a given node also includes the number of routes defined at that node for the given destination map and the algorithm to be used in choosing between the routes that are defined. All of these parameters, which comprise the component of a destination map at a given node, are allowed to differ from node to node, even for the same destination map. Thus, a particular destination map may use more allowed exit paths at some nodes than at others, or may utilize different algorithms at different nodes. These degrees of freedom can be exploited by the network designer or system administrator to tailor the routing characteristics to suit different circumstances at different nodes of the network.

Another degree of freedom available to the network designer or system administrator is the ability to define multiple destination maps leading to the same destination node. This additional freedom can be exploited for many purposes. For example, FIG. 31 shows how the single destination map that led to node B in the previous example (destination map B in FIG. 30) could be split into two destination maps. These destination maps both have the same exit paths defined at each node of the network but use different algorithms to choose between these exit paths. In this example, destination map B1 uses algorithm 1 (routing on failure) while destination map B2 uses algorithm 2 (routing on health). Thus, destination maps B1 and B2 are cases where the specified configurations are geometrically the same, but the volatility of the packet switching is different between destination maps B1 and B2 due to the different routing algorithms defined.

A second reason to use multiple destination maps to get to the same destination node is shown in FIG. 32. This shows the use of two different destination maps leading to the same destination node, with the different destination maps using different intermediate paths to get to the destination node. Destination map B3 in FIG. 32 is essentially the same as destination map B1 in FIG. 31, except that the preference order of exit paths at node A and node C have been reversed. Referring to FIG. 1, destination map B3 may not seem desirable since the primary route is not the most direct path to node B. However, if FIG. 1 is a subset of a much larger network, it can be seen that there is not a strong preference between link 7 and link 3 out of node A to get to some remote destination node. Thus, it might be desirable to split the traffic such that some applications would use destination map B1 to get to destination node B, while other applications would use destination map B3 to get to destination node B. This allows some engineering of traffic when the network is configured while still retaining the ability to bypass downed links.

A third reason to use multiple destination maps to get to the same destination node is to allow reserved destination maps for each source node that communicates with a given destination node. Thus, one destination map might be defined for packets originating at source node A to get to destination node B; while a different destination map might be defined for packets originating at source node C to get to destination node B. This allows easier configuration of large, complex networks since a given destination map need only define the routing needed to get from a particular source node to a particular destination node. This contrasts to the more difficult task of defining the routing needed to get to a particular destination node from all other nodes in the network. In addition, the capability of defining destination maps for particular source node, destination node pairs allows more specific and finely tuned destination maps to be defined.

A fourth reason to use multiple destination maps to get to the same destination mode is for security purposes. It is possible to define destination maps in such a way that some destination maps are more secure than others. One destination map, for example, could be defined to use only secure transmission facilities, such as underground fiber links. Another destination map could be defined to use less secure transmission facilities, such as satellite links.

A data link is defined as a physical channel, a path or circuit that carries data between two endpoints connected to the data link. This corresponds to the physical layer of ISO model.

A logical channel is defined as one of many virtual circuits that can be multiplexed onto a single physical link. This allows a single path to serve the function of a plurality of separate and independent paths.

An application is a user-defined procedure or process residing in the host processor. This corresponds to application layer of the ISO model.

What is claimed is:

1. A method for providing for the alternate routing of messages transmitted from an originating node to a destination node in a packet switching system having a plurality of nodes wherein each node stores routing information, said method comprising the steps of:
   (A) inserting a message to be transmitted into a first field of a multifield frame,
   (B) inserting alternate routing control control into a second field of said frame,
   (C) transmitting said frame from said originating node over a path towards said destination node via an intermediate node,
   (D) using said alternate routing control information in said transmitted frame to access said stored routing information at said intermediate node specifying a plurality of paths available for transmitting said frame from said intermediate node towards said destination node,
   (E) selecting one of said specified paths under control of said stored routing information, and
   (F) transmitting said message frame from said intermediate node towards a destination node via said selected specified path.

2. The method of claim 1 wherein said frame further comprises a logical channel index and wherein said method further comprises the steps of:
   (A) receiving said frame at said destination node, and
   (B) using said logical channel index in said frame received at said destination node to specify the one of a plurality of applications at said destination node to which the message of said frame is directed.

3. A method for providing for the alternate routing of messages transmitted from an originating node to a destination node in a packet switching system having a plurality of nodes wherein each node stores routing information, said method comprising the steps of:
   (A) inserting a message to be transmitted into a first field of a multifield frame,
   (B) inserting alternate routing control information into a second field of said frame,
   (C) transmitting said frame from said originating node over a path towards said destination node via one or more intermediate nodes,
   (D) using said alternate routing control information in said transmitted frame at each intermediate node receiving said frame to access said stored routing information of each said intermediate node specifying a plurality of paths available for transmitting said frame from each said intermediate node towards said destination node,
   (E) selecting at each said intermediate node one of said specified paths under control of said stored routing information at each said intermediate node, and
   (F) transmitting said message frame from each said intermediate node towards said destination node via said specified path selected at each said intermediate node.

4. The method of claim 3 wherein said frame further comprises a logical channel index and wherein said method further comprises the steps of:
(A) receiving said frame at said destination node, and
(B) using said logical channel index in said frame received at said destination node to specify the one of a plurality of applications at said destination node to which the message of said frame is directed.

5. The method of claim 3 wherein said alternate routing control information inserted into said frame, further comprises postage information specifying the number of nodes through which said frame may travel and wherein said method further comprises the steps of:
(A) comparing said postage information with zero each time a frame is received by an intermediate node,
(B) aborting said frame if said compared amount is zero,
(C) decrementing said postage information if said compared amount is not equal to zero, and
(D) inserting said decremented amount into said frame prior to transmission of said frame from said intermediate node.

6. A method for providing for the alternate routing of messages transmitted from an originating node to a destination node in a packet switching system having a plurality of nodes wherein each node stores routing information, said method comprising the steps of:
(A) inserting a message to be transmitted into a first field of a multifield frame,
(B) inserting alternate routing control information into a second field of said frame,
(C) transmitting said frame from said originating node over a path towards said destination node via one or more intermediate nodes,
(D) using said alternate routing control information in said transmitted frame at each intermediate node receiving said frame to access said stored routing information at each said intermediate node specifying a plurality of paths and an algorithm to be used to select one of said plurality of paths for use in transmitting said frame from each said intermediate node towards said destination node,
(E) executing the specified algorithm at each said intermediate node to select one of said specified paths at each said intermediate node, and
(F) transmitting said message frame from each said intermediate node towards said destination node via said specified path selected at each said intermediate node.

7. The method of claim 6 wherein said frame further comprises a logical channel index and wherein said method further comprises the steps of:
(A) receiving said frame at said destination node, and
(B) using said logical channel index in said frame received by said destination node to specify the one of a plurality of applications at said destination node to which the message of said frame is directed.

8. The method of claim 6 wherein said alternate routing control information inserted into said frame further comprises postage information specifying the number of nodes through which said frame may travel and wherein said method further comprises the steps of:
(A) comparing said postage information with zero each time a frame is received by an intermediate node,
(B) aborting said frame if said compared amount is zero,
(C) decrementing said postage information if said compared amount is not equal to zero, and
(D) inserting said decremented amount into said frame prior to transmission of said frame from said intermediate node.

9. The method of claim 6 wherein said path comprises a data link and a logical channel.

10. The method of claim 9 wherein each of said nodes comprises a host processor and a packet switch interconnected by a path.

11. A method for providing for the alternate routing of messages transmitted from an originating node to a destination node in a packet switching system having a plurality of nodes wherein each node stores routing information, said method comprising the steps of:
(A) inserting a message to be transmitted into a first field of a multifield frame structured to define a layered protocol,
(B) inserting alternate routing control information into a second field of said frame to define an alternate routing protocol layer for said frame, said alternate routing control information comprising a destination map index subfield,
(C) transmitting said frame from said originating node towards said destination node via more than one intermediate nodes,
(D) identifying the path by which each frame arrives at each one of said nodes to which it is transmitted,
(E) determining from said identification and from said stored information at at least one of said intermediate nodes receiving said frame that said frame is not to be alternate routed and is to be routed out from said one intermediate node via a path specified solely by the path on which said frame arrives at said one intermediate node,
(F) determining from said identification and from the arrival of said frame on a path at another one of said intermediate nodes that said frame is to be alternate routed,
(G) using said last named determination and said destination map index of said received frame as address information to read out stored information at said other intermediate node identifying a plurality of paths and an algorithm to be used in specifying one of said identified paths,
(H) executing said identified algorithm to specify one of said identified paths, and
(I) transmitting said message frame from each of said intermediate nodes towards said destination node via the path specified for use at each of said intermediate nodes.

12. The method of claim 11 wherein each of said paths comprises a data link and a logical channel.

13. The method of claim 11 wherein said alternate control routing field information further comprises a logical channel index subfield and wherein said method further comprises the steps of:
(A) transmitting said frame from one of said intermediate nodes receiving said frame to said destination node, and
(B) using said logical channel index subfield in said frame received by said destination node to specify the one of a plurality of applications at said destination node to which the message of said frame is directed.

14. The method of claim 11 wherein said alternate routing control information further comprises a postage information subfield specifying the number of nodes through which said frame may travel and wherein said method further comprises the steps of:
(A) comparing said postage subfield with zero each time a frame is received by an intermediate node,
(B) aborting said frame if said compared amount is zero,
(C) decrementing said postage subfield if said compared amount is not equal to zero, and
(D) inserting said decremented amount into said postage field of said frame prior to transmission from said intermediate node.

15. The method of claim 14 wherein each of said nodes comprises a host processor and a packet switch interconnected by a path.

16. A method for providing for the alternate routing of messages transmitted from an originating node to a destination node in a packet switching system having a plurality of nodes wherein certain ones of said nodes store routing information, said method comprising the steps of:
(A) inserting said message into a first field of a multi-field frame structured to define a layered protocol,
(B) inserting alternate routing control information into a second field of said frame to define an alternate routing protocol layer for said frame, said alternate routing information comprising a destination map index subfield,
(C) transmitting said frame from said originating node towards said destination node via two or more intermediate nodes,
(D) identifying the path by which said frame arrives at each one of said nodes to which it is transmitted,
(E) determining from said path identification at one of said intermediate nodes receiving said frame that said frame is not to be alternate routed and is to be routed out from said one intermediate node via a path specified solely by the path on which said frame arrives at said one intermediate node,
(F) transmitting said frame from said one intermediate node towards said destination node via said specified path,
(G) determining from said identification at another intermediate node receiving said frame that said frame is to be alternate routed, .
(H) using said last named determination and said destination map index of said received frame as address information to read out stored information from said other intermediate node identifying a plurality of paths and an algorithm to be used in selecting one of said identified paths,
(I) executing said identified algorithm to select one of said identified paths, and
(J) transmitting said frame from said other intermediate node towards said destination node via said selected path.

17. The method of claim 16 wherein said alternate control routing information inserted into said frame further comprises a postage information subfield specifying the number of nodes through which said frame may travel and wherein said method further comprises the steps of: .
(A) comparing said postage subfield with zero each time a frame is received by an intermediate node,
(B) aborting said frame if said compared amount is zero,
(C) decrementing said compared amount if said compared amount is not zero, and
(D) inserting said decremented amount into said postage field of said frame prior to transmission from said intermediate node if said compared amount is not zero.

18. The method of claim 17 wherein said alternate routing control information further comprises a logical channel index subfield and wherein said method further comprises the steps of:
(A) transmitting said frame from one of said intermediate nodes to said destination node, and
(B) using said logical channel index subfield in said frame received by said destination node to specify the one of a plurality of applications at said destination node to which the message of said frame is directed.

19. The method of claim 18 wherein each of said paths comprises a data link and a logical channel.

20. The method of claim 19 wherein each of said nodes comprises a host processor and a packet switch interconnected by a path.

21. A method for providing for the alternate routing of messages transmitted from an originating to a destination node in a packet switching system having a plurality of nodes wherein each node stores routing information and wherein each node comprises a host processor and a packet switch interconnected by a path, said method comprising the steps of:
(A) generating message information and alternate routing control information and destination node information in the host processor of said originating node,
(B) transmitting said information from said host processor over said path to the packet switch of said originating node,
(C) operating said packet switch at said originating node to insert said message information into a first field of a multifield frame structured to define a layered protocol,
(D) operating said packet switch at said originating node to insert said alternate routing control information into a second field of said frame to define an alternate routing protocol layer for said frame, said alternate routing control information comprising a destination map index subfield,
(E) transmitting said frame from said originating node towards said destination node via at least one intermediate node,
(F) identifying the path by which each frame arrives at each one of said intermediate nodes to which it is transmitted,
(G) determining from said identification at an intermediate node receiving said frame that said frame is to be alternate routed,
(H) using said last named determination and said destination map index of said received frame as address information to read out stored information from said intermediate node identifying a plurality of paths and an algorithm to be used in selecting one of said identified paths,
(I) executing said identified algorithm to select one of said identified paths, and
(J) transmitting said frame from said intermediate node towards said destination node via said selected path.

22. The method of claim 21 wherein said host processor at said originating node also generates destination node application information that is transmitted over said path to the packet switch of said originating node and wherein said alternate routing field control information further comprises a logical channel index subfield containing said destination node application information, said method further comprising the steps of:
(A) transmitting said frame from one of said intermediate nodes to said destination node, and
(B) using said logical channel index subfield in said frame received by said destination node to specify the one of a plurality of applications at said destination node to which the message of said frame is directed.

23. The method of claim 22 wherein said alternate routing control information generated by said host processor at said originating node includes postage information that is transmitted over said path to the packet switch of said originating node and wherein said alternate routing field information further comprises a postage subfield containing said postage information specifying the number of nodes through which said frame may travel, said method further comprising the steps of:
(A) comparing said postage information with zero each time a frame or message information is received by a node,
(B) aborting said frame or said information if said compared amount is zero,
(C) decrementing said postage information if said compared amount is not zero, and
(D) inserting said decremented amount into said postage field of said frame prior to transmission from said node if said compared amount is not zero and if said last named node is not said destination node.

24. The method of claim 23 wherein each of said paths comprises a link and a logical channel.

25. The method of claim 24 wherein said method further comprises the steps of:
(A) operating the packet switch of each node receiving a frame to use the destination index field of each received frame to determine whether the received frame specifies each said node as the destination node of said packet,
(B) transmitting said message field of said received said frame to the host processor of each said node if said node is the specified destination node, and
(C) transmitting said frame out over a specified path towards said destination node if each said node is not said destination node.

26. The method of claim 21 wherein there are a plurality of available algorithms at each node and wherein said step of identifying includes the step of identifying one of said plurality of available algorithms.

27. The method of claim 21 wherein said readout of said stored information at a node includes information specifying the number of available paths that are available to transmit said frame.

28. A method for providing for the alternate routing of messages transmitted from a host processor at an originating node to a destination node in a packet switching system having a plurality of nodes wherein each node stores routing information, said method comprising the steps of:
(A) inserting a message to be transmitted into a first field of a multifield frame,
(B) inserting alternate routing control information into a second field of said frame,
(C) transmitting said frame from said host processor at said originating node to a packet switch at said originating node,
(D) using said alternate routing control information in said transmitted frame to access said stored routing information at said originating node specifying a plurality of paths available for transmitting said frame from said originating node towards said destination node,
(E) selecting one of said specified paths under control of said stored routing information, and
(F) transmitting said message frame from said originating node towards a destination node via said selected specified path.

29. The method of claim 28 wherein said method further comprises the steps of:
(A) receiving said frame transmitted by said originating node at a node intermediate said originating node and said destination node,
(B) using said alternate routing control information in said transmitted frame to access said stored routing information at said intermediate node specifying a plurality of paths available for transmitting said frame from said intermediate node towards said destination node,
(C) selecting one of said specified paths under control of said stored routing information, and
(D) transmitting said message frame from said intermediate node towards a destination node via said selected specified path.

* * * * *